June 17, 1958  P. O. PFEIFFER ET AL  2,839,440
METHOD OF MAKING AN AIR CUSHION ASSEMBLY
Filed July 23, 1956  11 Sheets-Sheet 1
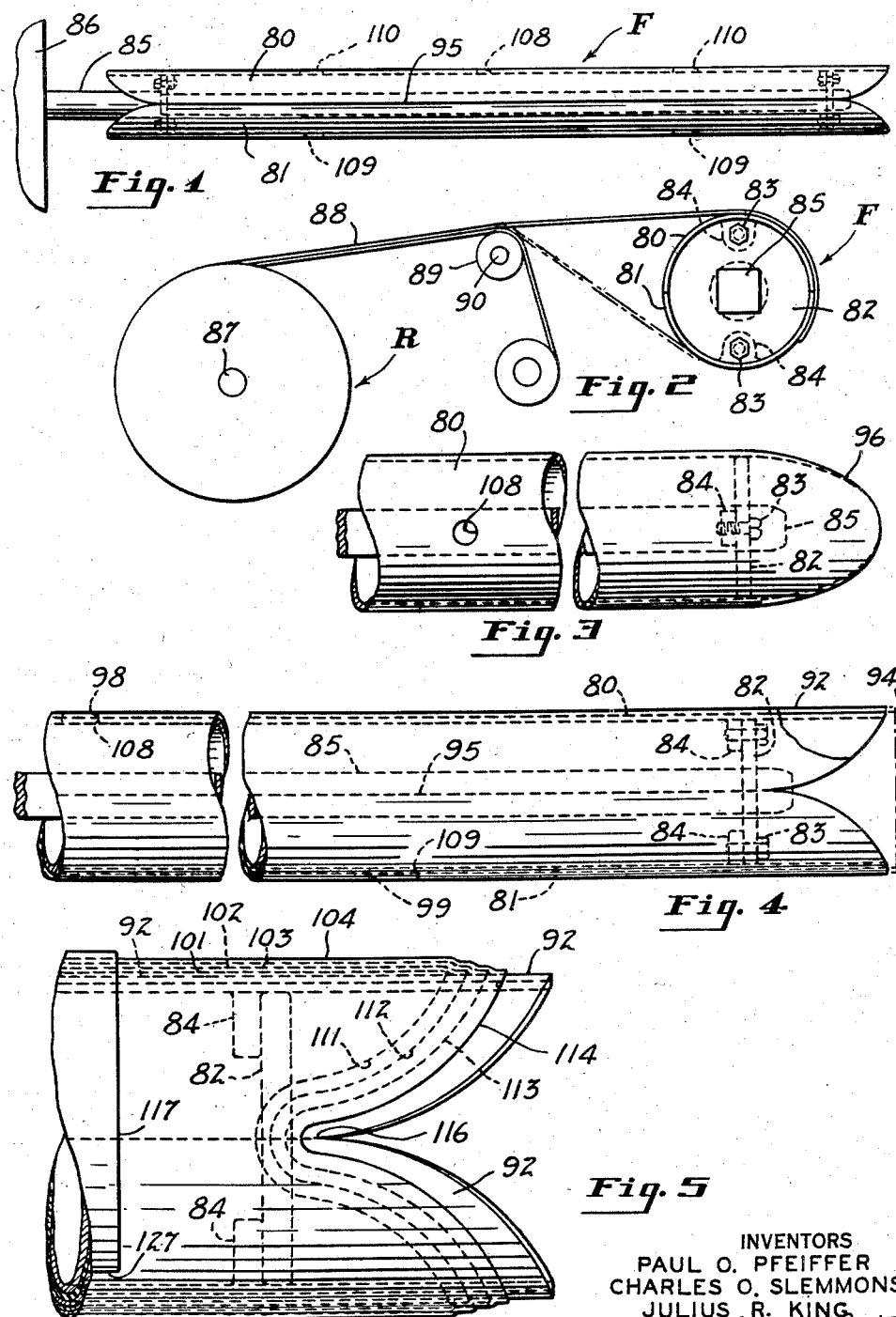
INVENTORS
PAUL O. PFEIFFER
CHARLES O. SLEMMONS
JULIUS R. KING
BY
ATTORNEYS June 17, 1958
P. O. PFEIFFER ET AL
2,839,440
METHOD OF MAKING AN AIR CUSHION ASSEMBLY
Filed July 23, 1956
11 Sheets-Sheet 2
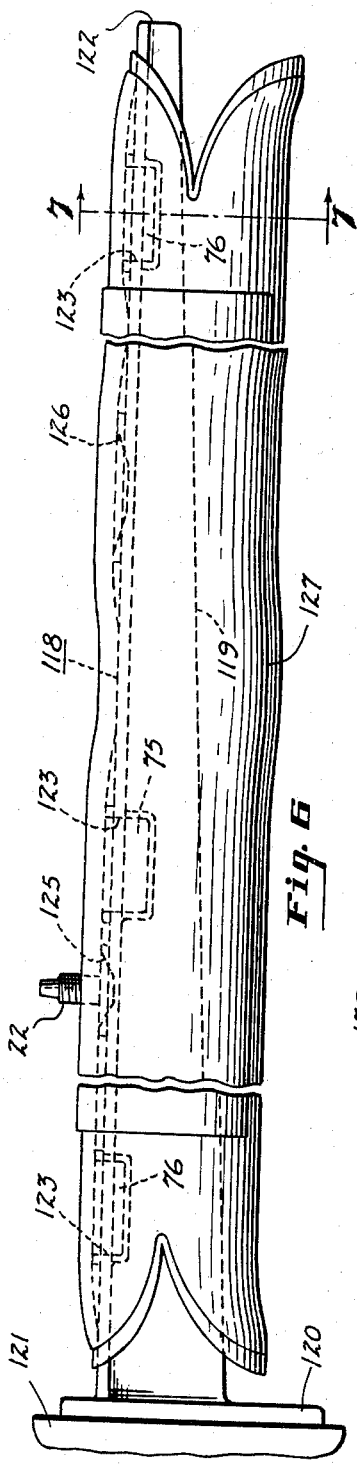
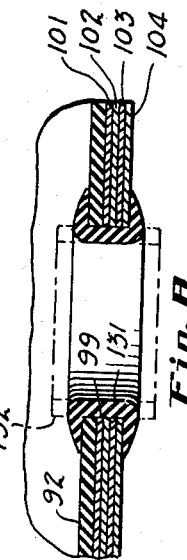
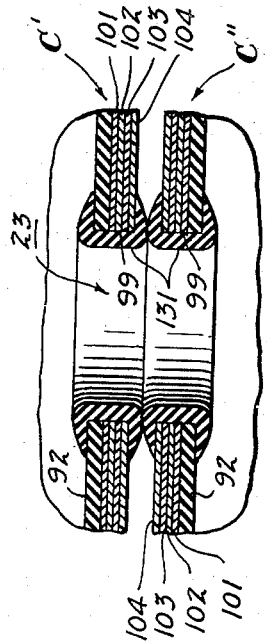
INVENTORS
PAUL O. PFEIFFER
CHARLES O. SLEMMONS
JULIUS R. KING
BY McCoy, Greene & Te Grotenhuis
ATTORNEYS June 17, 1958  P. O. PFEIFFER ET AL  2,839,440
METHOD OF MAKING AN AIR CUSHION ASSEMBLY
Filed July 23, 1956  11 Sheets-Sheet 3
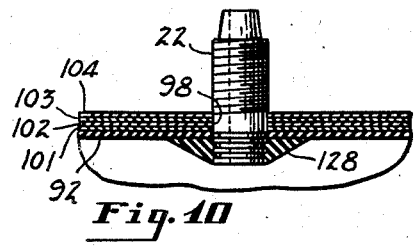
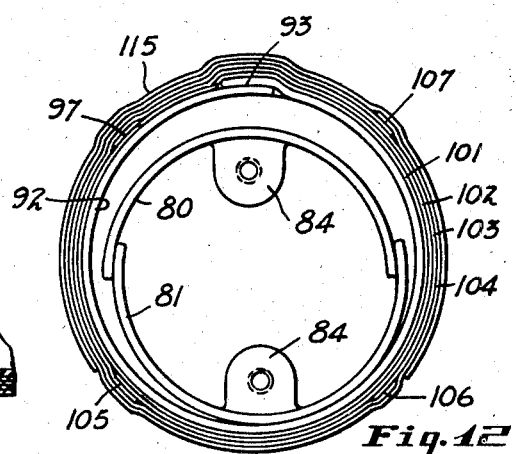
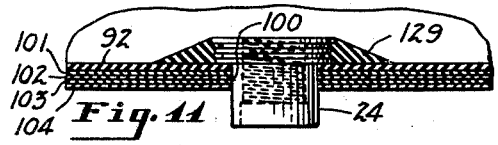
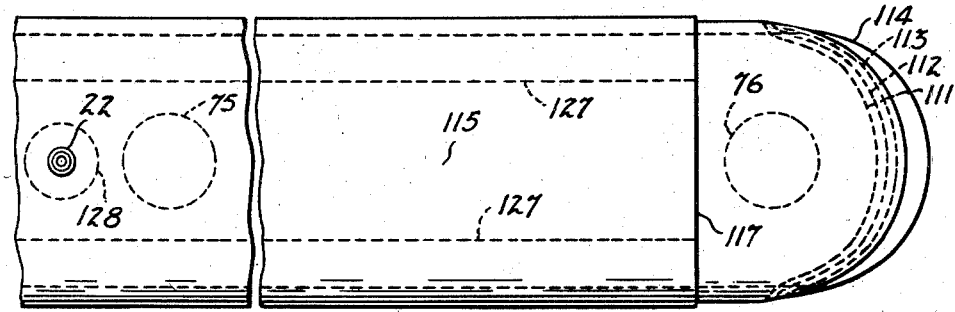
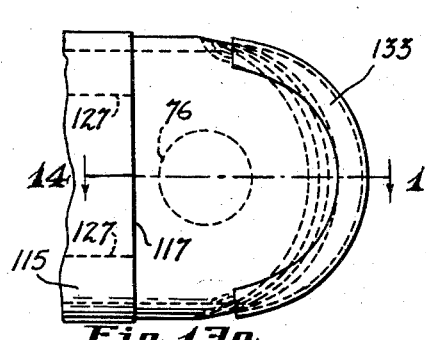
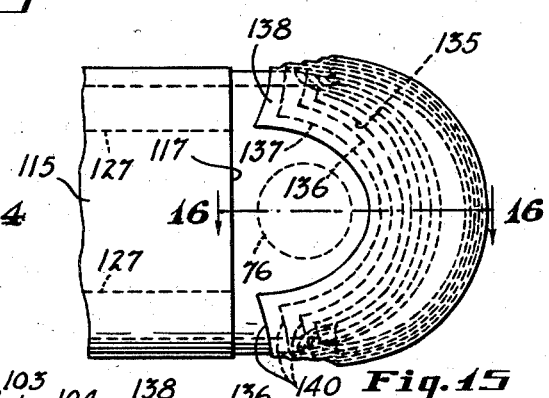
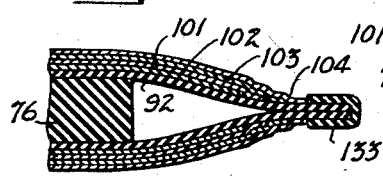
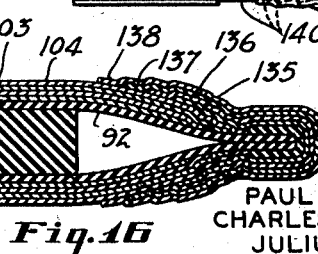
INVENTORS
PAUL O. PFEIFFER
CHARLES O. SLEMMONS
JULIUS R. KING
BY
ATTORNEYS June 17, 1958  P. O. PFEIFFER ET AL  2,839,440
METHOD OF MAKING AN AIR CUSHION ASSEMBLY
Filed July 23, 1956  11 Sheets-Sheet 4

INVENTORS
PAUL O. PFEIFFER
CHARLES O. SLEMMONS
JULIUS R. KING
BY
ATTORNEYS

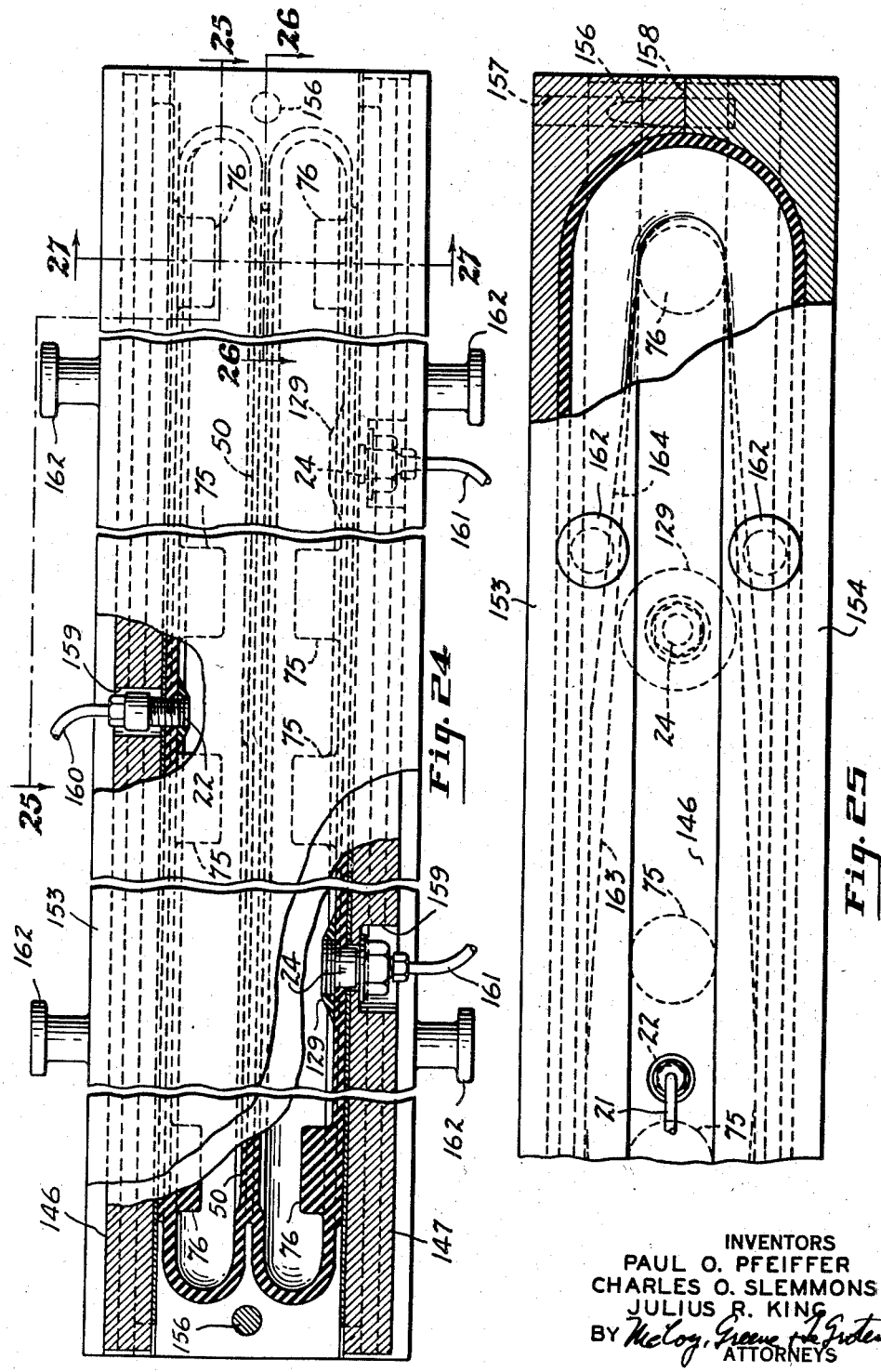

June 17, 1958 P. O. PFEIFFER ET AL 2,839,440
METHOD OF MAKING AN AIR CUSHION ASSEMBLY
Filed July 23, 1956 11 Sheets-Sheet 7
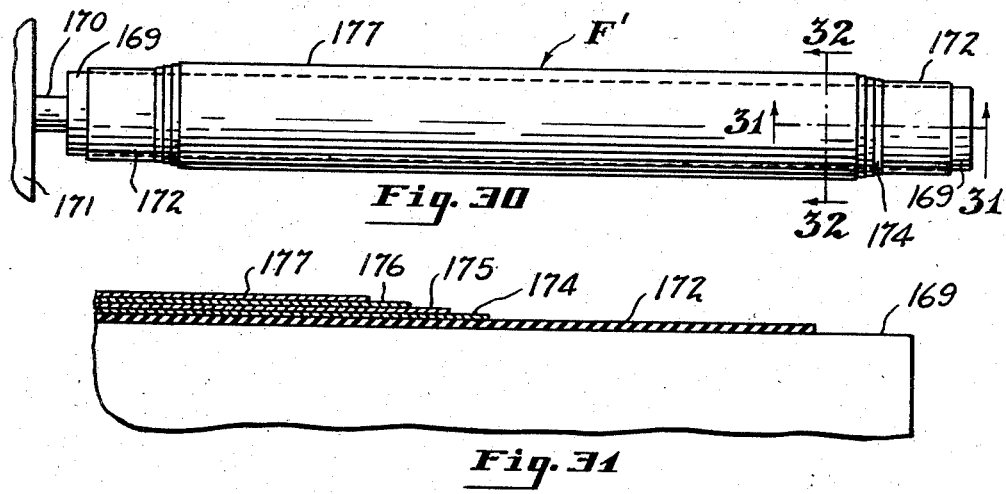
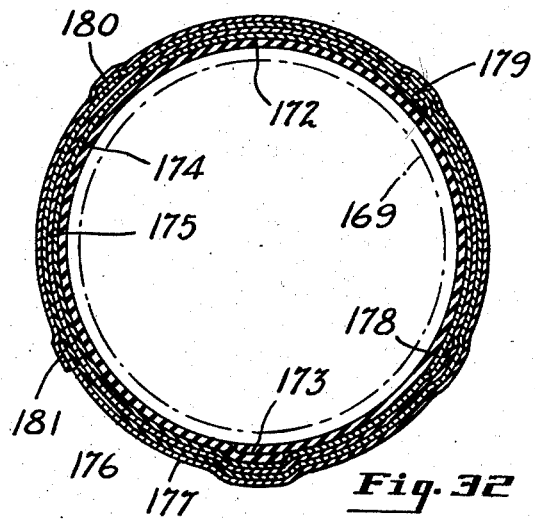
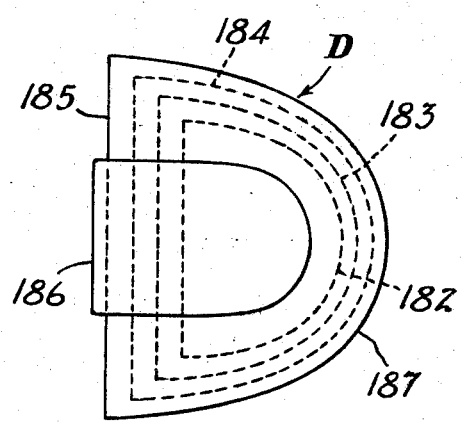
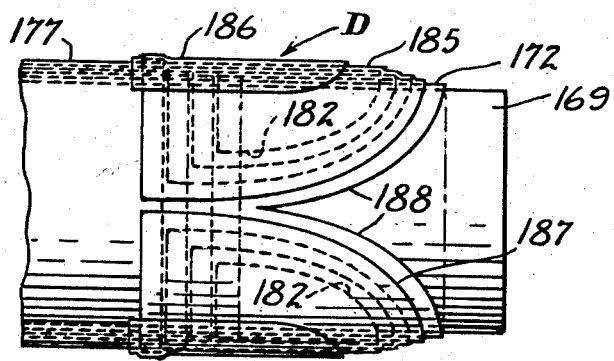
INVENTORS
PAUL O. PFEIFFER
CHARLES O. SLEMMONS
JULIUS R. KING
BY
ATTORNEYS

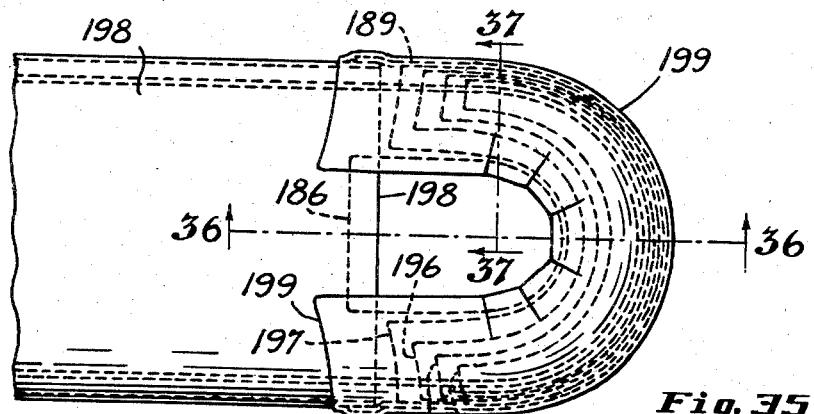
Fig. 35
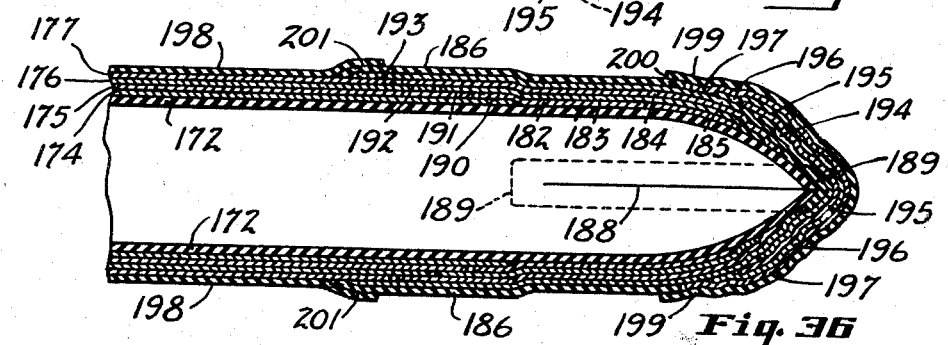
Fig. 36
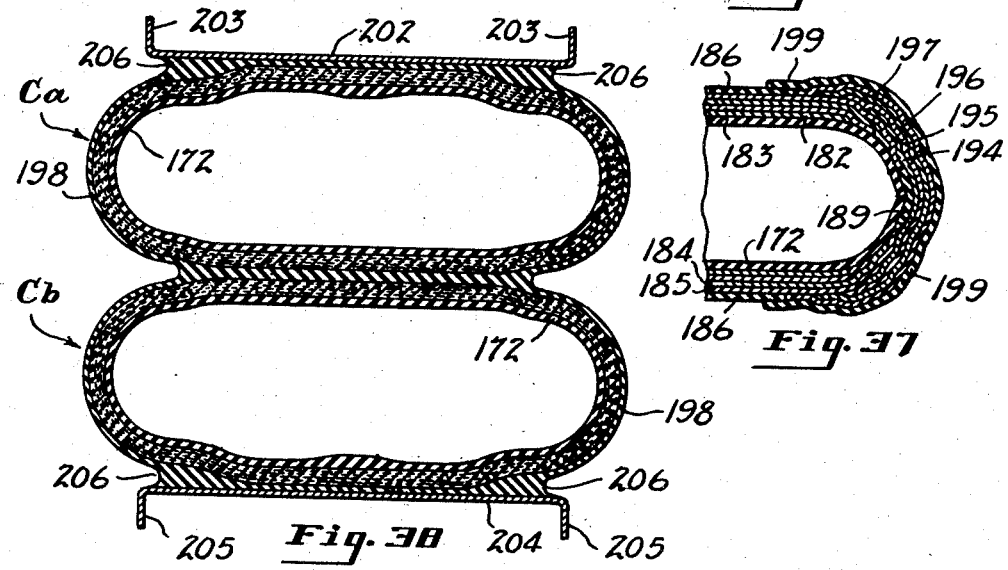
Fig. 37
Fig. 38
INVENTORS
PAUL O. PFEIFFER
CHARLES O. SLEMMONS
JULIUS R. KING
ATTORNEYS June 17, 1958     P. O. PFEIFFER ET AL     2,839,440
METHOD OF MAKING AN AIR CUSHION ASSEMBLY
Filed July 23, 1956     11 Sheets-Sheet 9

INVENTORS
PAUL O. PFEIFFER
CHARLES O. SLEMMONS
JULIUS R. KING
BY
ATTORNEYS

June 17, 1958 P. O. PFEIFFER ET AL 2,839,440
METHOD OF MAKING AN AIR CUSHION ASSEMBLY
Filed July 23, 1956 11 Sheets-Sheet 10

INVENTORS
PAUL O. PFEIFFER
CHARLES O. SLEMMONS
JULIUS R. KING
BY
ATTORNEYS

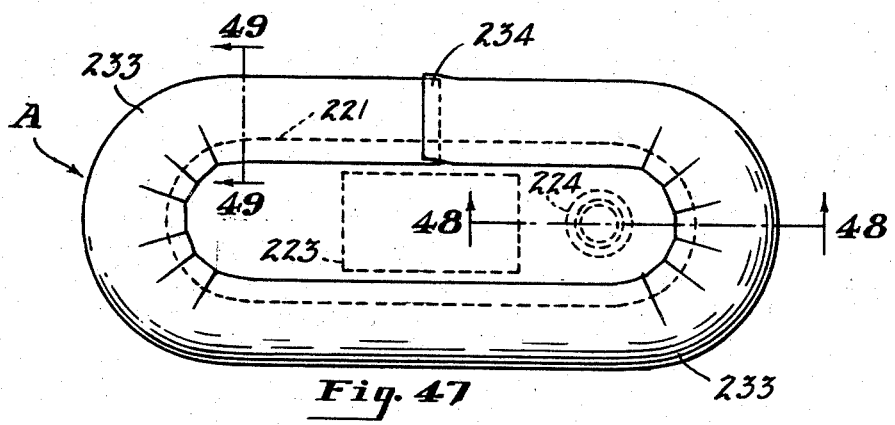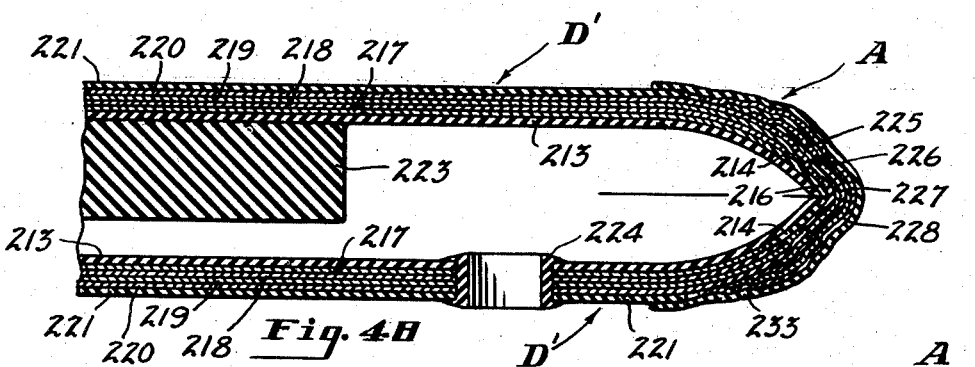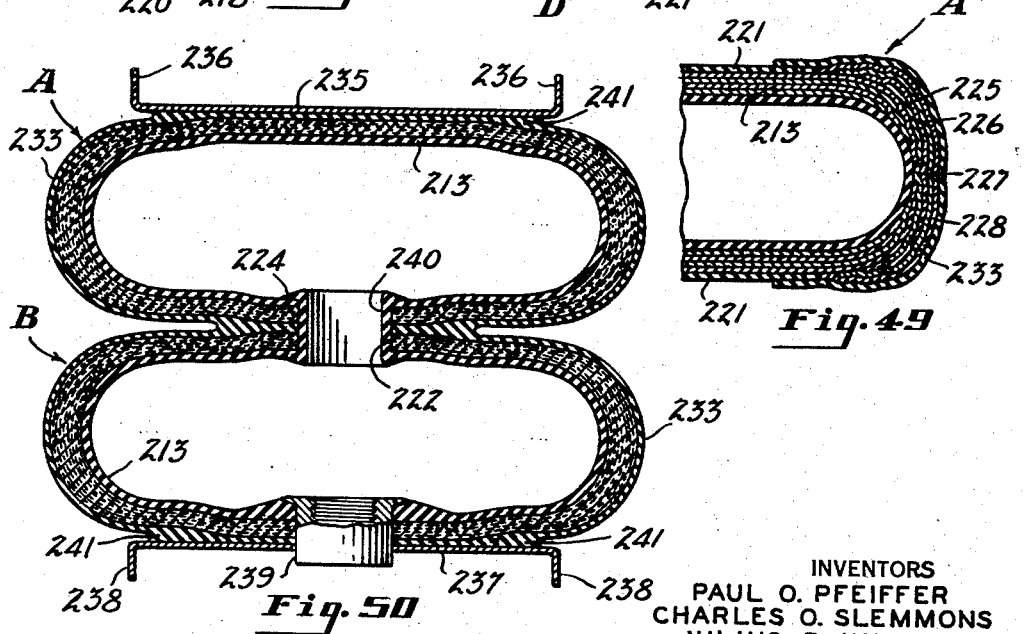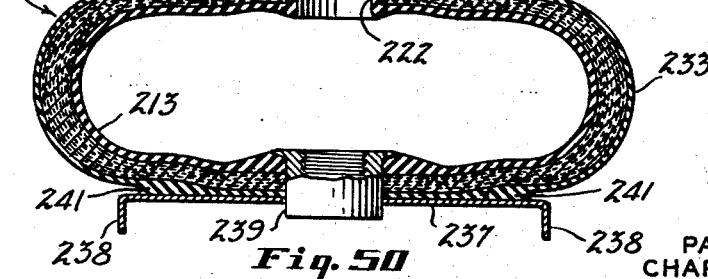

Patented June 17, 1958

2,839,440
METHOD OF MAKING AN AIR CUSHION ASSEMBLY

Paul O. Pfeiffer, Charles O. Slemmons, and Julius R. King, Akron, Ohio, assignors to The General Tire & Rubber Company, Akron, Ohio, a corporation of Ohio Application July 23, 1956, Serial No. 599,541

10 Claims. (Cl. 154—85)

The present invention relates to the manufacture of pneumatic cushions for use in the suspension systems of vehicles and more particularly to elongated inflatable cushions and methods of making the same.

This application is a continuation-in-part of our co-pending application Serial No. 301,735 filed July 30, 1952, now Patent No. 2,756,048, granted July 24, 1956.

Some of the aims of this invention are to overcome deficiencies of prior cushions of the elongated type and to provide a generally improved long-lived cushion having desirable operating characteristics. Prior to this invention, pneumatic cushions of the elongated type have usually had walls of non-uniform thickness whereby stress concentrations occur and ultimate wall failures or ruptures result.

In the cushion of the present invention, a pair of cells, each of flattened cross section and of substantially uniform wall thickness throughout, are superimposed one on another. At their ends the individual cells of the cushion assembly have closure structures that avoid objectionable irregularities in cell wall thickness, the joints between the end closures and the side walls of the cells comprising multiple sheet material layers having staggered edges and the joints extending in substantially semi-circular curves around the cell ends.

The methods of the present invention are aimed to satisfy the needs of either high or low production rates in either a large factory or a small shop. The invention contemplates the making of a multiple cell cushion by separately forming individual cells which are assembled together and vulcanized or cured to final form and shape in a confining mold. Each cell of the cushion, comprising multiple layers of cord reinforced sheet rubber material, is laid up on a mandrel or form, preferably cylindrical and preferably rotatable, to form an open-ended cylindrical blank. The mandrel on which the tubular cell blank is built serves as a means for locating certain wall apertures in the cell blank in relation to one another and in relation to the cell blank ends. As a special feature of the building process the forming mandrel may constitute a template for shaping the contours of the cell blank ends to insure uniformity and alignment of the end closure structure on one end of the cell with the corresponding structure on the other end of the cell.

Another object of the invention concerned with the cushion building process is to provide a simple and effective system for locating the internal supporting beams or blocks in proper relation to the cell walls and to one another. This phase of the invention contemplates the transfer of the open-ended cell blank from the mandrel on which it is formed to an elongated support that is received internally of the cell blank and on which supporting blocks and air stems or other components of the cell structure have previously been located in predetermined relative positions. Thus the support blocks are located in correct relative position, not only relative to one another, the cell blank and other components of the same cell, but also relative to the corresponding blocks in the other cells of the cushion assembly.

Another object concerned with the molding or vulcanizing process and apparatus contemplates the use of a confining frame to hold the completed cushion structure while in the uncured state in assembled relation during placement of the cushion in a mold. By employing a confining frame for the assembled but uncured cushion assembly the latter can be partially inflated to prevent objectionable adhering together of the cell walls during handling and insertion into the mold. As a specialized version of the process and apparatus the confining frame components, or some of them, are incorporated in the mold structure and remain in place against or about the cushion assembly during the curing process. In this fashion the confining frame is available for use in removal of the cushion assembly from the mold upon completion of the curing process.

According to the present invention an elongated tubular cell is formed having a series of fabric reinforcing plies adhered to an inner tubular rubber layer. Each end of the cell is cut to provide a rounded fishmouth which is sealed after the rubber bumpers, air fittings, valves and/or grommets have been assembled, the rounded ends of the fabric layers being staggered and offset. A series of generally rectangular fabric strips are then applied over the ends of the cell to reinforce the end joints, the side and end edges of these strips also being staggered and offset. An outer oil-resistant layer of a suitable material such as neoprene or the like is then applied to cover the cell which may be joined to one or more other cells and/or to a metal channel or other rigid member before vulcanization in a mold. The vulcanized multiple-cell pneumatic cushion is suitable for pneumatic suspension systems of the type described in U. S. Patents Nos. 2,742,301, 2,742,302, and 2,756,048.

The rate of production may be speeded up substantially by employing pre-cut multiple-ply fabric patches to reinforce the end portions of each cell and to form the fish mouths. This method eleminates the need for templates and the need for trimming each fabric ply manually as it is applied without seriously reducing the strength of the cell or its suitability in motor vehicle suspension systems. The method also permits the use of a substantial amount of semi-automatic machinery to speed up the manufacture and reduce the labor cost. The pre-cut fabric patches also serve as guides during trimming of the inner tubular layer of rubber so that templates need not be used.

Where long cells are being made, the multiple-ply patches are preferably D-shaped or heel-shaped and relatively short and are applied to the opposite ends of the inner layer of tube stock so as to overlap the fabric covering the main portion of said inner layer. With this patch method, four plies of fabric can be wrapped around the inner tubular layer and four pre-cut multiple-ply patches can be applied to the ends of said layer in one or two minutes using a motor-driven mandrel to support and rotate the tube and a semi-automatic servicer to supply the long fabric layers.

Where short cells are being made it is preferable to employ rounded oblong multiple-ply fabric patches of generally oval or elliptical shape or patches having short intermediate portions of uniform width and length and rounded end portions integral therewith. Such patches would extend substantially the full length of the cell and could be applied to the top and bottom of the inner tubular layer in less than half a minute. When this method is employed, the rectangular strips reinforcing the ends of the cell are preferably sufficiently long so that they cover the sides as well as the ends of the cell.

An object of the invention is to provide a practical method for making durable elongated pneumatic cushions at low cost.

Another object of the invention is to provide improved methods of making elongated pneumatic cushions which minimize the time required for applying the fabric plies.

A further object of the invention is to provide a superior method for reinforcing the closed ends of tubular fabric-reinforced rubber cells.

Other objects and advantages of the invention will become apparent to those skilled in the art from the following description and claims, together with the drawings which form the disclosure. In the drawings:

Figure 1 is an elevational view diagrammatic in character showing a rotatable and collapsible building form or mandrel suitable for use in making the cushion cells of the present invention;

Figure 2 is a diagrammatic end elevational view of the building form or mandrel of Fig. 1, together with a supply roll of the sheet material used in building the cushions, and a guide roll, this view being enlarged with respect to Fig. 1;

Figure 3 is a fragmentary foreshortened plan view showing one end of the building form or mandrel of Fig. 2;

Figure 4 is a foreshortened side elevational view at one end of the building form or mandrel, partly in section and with parts broken away and removed, this view showing in position on the mandrel a layer of raw or partly cured rubber sheet stock which forms the rubber lining of the cushion cell;

Figure 5 is an elevational view of the right-hand end of the mandrel or form of Figs. 1 and 4, enlarged with respect to those figures, showing several layers of cord reinforced rubber sheet material wrapped about the form, the ends of the sheet material layers being contour trimmed in stepped or staggered relation;

Figure 6 is a foreshortened side elevational view of a supplemental mandrel used in the cell building process of the present invention, this view showing a tubular open ended cell blank supported on the mandrel.

Figure 7 is a transverse sectional detail taken substantially on the line indicated at 7—7 of Fig. 6 and enlarged with respect to that figure;

Figure 8 is a fragmentary sectional detail through a portion of the wall of one of the cells showing the manner in which the aperture which forms the cell connecting passage is reinforced;

Figure 9 is a fragmentary sectional detail showing the manner in which the apertures in the walls of the cells are placed in registry to form a connecting passage;

Figure 10 is a fragmentary sectional detail through a portion of the top wall of the upper cell showing the air stem through which air is admitted to and released from the cushion;

Figure 11 is a fragmentary sectional detail through a portion of the bottom wall of the lower cell showing the stem through which air flows between the flexible cushion and the air box or hollow beam;

Figure 12 is an end elevational view of the building form or mandrel of Figs. 1 to 5 on the same scale as Fig. 5 showing the mandrel partially collapsed and the open ended tubular cell blank of Figure 5 on the mandrel prior to removal therefrom for application of the bumper blocks;

Figure 13 is a foreshortened plan view showing one end of the open ended tubular cell blank in collapsed condition after application of the bumper blocks and removal from the supplemental assembly mandrel of Fig. 6 and before the end closure is made;

Figure 13a is a fragmentary plan view similar to Fig. 13 showing the closed end of the cell with the narrow rubber reinforcing strip applied thereto;

Figure 14 is a fragmentary longitudinal vertical sectional view taken on the line 14—14 of Figure 13a;

Figure 15 is a fragmentary plan view showing the cell after the closed ends have been reinforced with fabric strips;

Figure 16 is a fragmentary longitudinal vertical sectional view taken on the line 16—16 of Figure 15;

Figure 24 is a foreshortened plan view, partly in section and with parts broken away and removed, showing a cushion in the curing mold;

Figure 25 is a fragmentary elevational view, partly in section and with parts broken away, showing one side of the mold, this view being taken substantitally along the line indicated at 25—25 of Figure 24 to show one end of the cushion in section;

Figure 30 is a side elevational view on a reduced scale showing a modified form of rotatable motor-driven building form or mandrel having a layer of tube stock and several layers of cord reinforced rubber sheet material wrapped about the form according to another method of the present invention;

Figure 31 is a fragmentary longitudinal sectional view taken on the line 31—31 of Figure 30 and on a larger scale;

Figure 32 is a fragmentary transverse vertical sectional view taken on the line 32—32 of Figure 30 and on a larger scale;

Figure 33 is a top plan view on a reduced scale showing one of four pre-cut five-layer heel-shaped patches to be applied to each cell, the patch being shown as it is assembled prior to mounting on the ends of the cell;

Figure 34 is a fragmentary side elevational view showing the tubular cell on the mandrel after two five-layer patches have been applied to each end of the cell and the inner layer of tube stock has been cut to a fishmouth shape, the position of the tube end prior to such cutting being shown in dot-dash lines;

Figure 35 is a fragmentary top plan view on a reduced scale showing the completed cell after it has been removed from the mandrel, closed at its ends, reinforced with fabric strips at its ends and covered with neoprene layers;

Figure 36 is a fragmentary longitudinal vertical sectional view taken on the line 36—36 of Figure 35 and on a larger scale;

Figure 37 is a fragmentary transverse vertical sectional view taken on the line 37—37 of Figure 35 and on the same scale as Figure 36;

Figure 38 is a transverse vertical sectional view with parts omitted showing the two cell pneumatic cushion as it appears when it is removed from the mold after vulcanizing;

Figure 47 is a top plan view similar to Figure 44 and on the same scale showing the completed cell after it has been covered with neoprene;

Figure 48 is a fragmentary longitudinal vertical sectional view taken on the line 48—48 of Figure 47 and on a larger scale;

Figure 49 is a fragmentary transverse vertical sectional view taken on the line 49—49 of Figure 47 and on the same scale as Figure 48; and Figure 50 is a transverse vertical sectional view of the completed vulcanized pneumatic cushion formed from cells made by the method of Figures 39 to 49.

Figure 17:
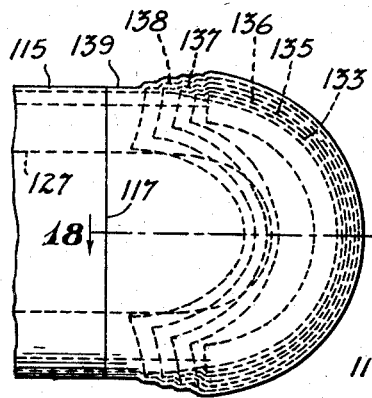
Figure 17 is a fragmentary plan view similar to Figure 15 and on the same scale showing the completed cell after the ends thereof have been covered with neoprene.
Figure 18:
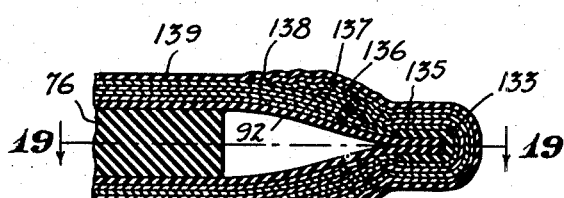
Figure 18 is a fragmentary longitudinal vertical sectional view taken on the line 18—18 of Figure 17.

In the drawings, like parts are identified with the same numerals throughout the several views. Some of the views are somewhat diagrammatic in character since it was necessary to exaggerate the thicknesses of some portions of the rubber and fabric layers so that they would be clearly visible in the drawings to illustrate the method of making the pneumatic cushions.

The cushion assembly made by the method of the present invention may be disposed under each of the side beams of a highway trailer as disclosed in U. S. Patent No. 2,742,301 or in various other ways as will occur to those skilled in the art. The cushion of each cushion assembly comprises a pair of elongated closed end tubular cells C' and C'' that are secured together over a longitudinally extending zone indicated at 17 and to top and bottom channel pans 18 and 19 respectively over similar longitudinally extending zones. Air is supplied to each cushion from a suitable source under the control of automatic or manual valves through a flexible conduit 21 that is attached to a metal stem 22 secured to and projecting upwardly from the top wall of the upper cell C', the top pan 18 having an opening 37 therein to receive the stem 22. Communication between the cells is through openings 23 in the dividing wall or partition between the cells and located in the zone of connection 17. The bottom cell C'' is connected for the interchange of air by means of threaded metal stems 24 secured to the bottom wall of the lower cell C''. These threaded stems extend through openings 25 in the bottom pan 19.

The channel pans 18 and 19 are of the same width and are formed along their opposite edges with longitudinally extending parallel flanges 29 that straddle the portions of the vehicle frame to which the pans are attached.

In the normal use of the suspension system the cells C' and C'' of each of the cushion assemblies are inflated through the supply conduits, one of which is indicated at 21, as disclosed in U. S. Patent No. 2,756,048.

Spacing means comprising rubber bumper blocks 75 and 76 are attached to any of the inside horizontal surfaces of the cushion cells. While attachment of the blocks to the common partition 50 is feasible, or the use of blocks some of which are attached to the common partition and some of which are attached to the top and bottom walls of the top and bottom cells is also feasible, it is preferred to attach the blocks, as shown, to the top and bottom walls respectively of the top and bottom cells, this arrangement facilitating assembly. The blocks 75 and 76 may be formed other than in the cylindrical shape shown and may be elongated axially of the cushion into substantially continuous ribs extending substantially the full length of the cushion but tapered in height to give desired rocking action.

In the top cushion C' the rubber center cushions or spacers 75 and the end cushions or spacers 76 are all bonded to the top wall while in the bottom cell C'' the blocks are all bonded to the bottom wall. Corresponding blocks in the several superposed cells are disposed in alignment with one another so that the blocks are superposed and bear against one another when the cushion is compressed or collapsed.

The central blocks or spacers 75 are of greater height or depth collectively than the end spacers 76 so that under heavy load or collapse of the cushion, the superposed center blocks bear against one another, the dividing wall or partition 50 being interposed. Thus the center blocks serve to support the load to which the suspension system is subjected should the cushions become deflated. End blocks 76, being of less height than the center blocks, normally do not come together in bearing relation when the cushion is deflated, the resulting clearance spaces permitting rocking action of the cushion assembly. In this rocking action the load continues to be carried primarily by the center blocks 75 which are superposed one above another to provide the desired support and to serve as a fulcrum for the rocking action. Although two pairs of center support blocks are shown, it is possible to utilize only a single pair of superposed center cushion blocks or to use a greater number than indicated. To obtain the rocker or walking beam action of the type disclosed in said Patent No. 2,756,048, it is necessary that the support provided by the aligned block pairs be localized at or adjacent the central tie links, leaving the end portions of the cells relatively free for limited additional collapsing movement under severe rocking action. The end blocks 76 come into play to resist complete collapsing of the air cells and thereby prevent pinching or other damaging action.

Each of the cells C' and C'' is made up of a plurality of layers of bias cord-reinforced rubber sheet material, an internal rubber liner and an external rubber cover, joined together and vulcanized or cured to form an integral unit.

The cells are each assembled on a split mandrel or form F comprising semi-cylindrical matching halves 80 and 81. These form halves together define an elongated cylindrical tube, the halves being of uniform section, except at their contoured ends, and being secured to internal rings 82 by cap screws 83 that extend through apertures in the rings and are threaded into internal lugs 84 welded or otherwise attached to the inside surfaces of the form halves 80 and 81.

A square bar or shaft 85 supports the form F for rotation about a horizontal axis, the bar being cantilever mounted in a suitable supporting structure 86 which includes suitable bearings for the rod or shaft and conventional drive and control means to rotate the shaft slowly in either direction or to lock the shaft against rotation in any desired position in accordance with well-known practice in the pneumatic tire building field. A supplemental support, not shown, is provided for the free end of the bar or shaft 85, such supplemental support being axially movable into and out of engagement with the rod end and being bodily shiftable in a lateral direction to permit removal of the completed or built-up cell blank axially from the form F.

The cord reinforced rubber sheet material to be used in building the cushions may be supplied in separate sheets cut to size or, as shown, it may be supplied in a single continuous roll R that is mounted on a horizontal shaft 87 on which the roll turns as the rubber sheet material indicated at 88 is withdrawn for use. The shaft 87 is suitably mounted in general parallel relation to the shaft 85 which carries form F so that the rubber sheet material 88 may be drawn directly onto the form from the supply roll over suitable intermediate guide rolls, one of which is indicated at 89, the guide roll being carried by a supporting shaft 90 which also parallels the form shaft 85.

In assembling one of the cushion cells C' or C'' a layer of raw or partly cured gum rubber stock is first placed about the mandrel or form F to constitute lining 92 of the cell. This lining may comprise a seamless rubber tube drawn axially over the cylindrical form or, as shown, it may be a sheet of gum rubber stock wrapped about the form with the sheet edges connected together in a lap joint 93, Figs. 7 and 12. The ends of the form halves 80 and 81 are contoured to serve as templates in trimming the gum stock liner 92 to the desired configuration. As shown in Figure 4, the gum rubber sheet material 92 as originally applied to the form F is longer than the form so that the ends of the rubber tube, one of which is indicated at 94, project axially beyond the form end. A hot knife, die or other suitable cutting implement is then drawn across the contoured ends of the form halves 80 and 81 to sever the projecting excess gum rubber stock material.

The contour of the form halves at each of their ends is such that the projection of their ends on parting plane 95 of the form halves is substantially parabolic (Figure 3). Curved edges 96 of the contoured ends of the form halves are each tangent to the respective edges of the form halves and to the meeting plane 95, the curved edges each extending in a continuous curve from the meeting edge on one side of the form to the meeting edge on the other side of the form. The contour of the curved edges is a developed curve which provides on the end of the gum rubber stock 92 a substantially semicircular curvature when the cell is in the collapsed or flattened condition as viewed, for example, in Fig. 13.

After the gum rubber stock is in position about the form F the cord reinforced rubber strip material 88 is drawn onto the form from the supply roll R, the form being rotated one revolution in this operation. Suitable rags may be wrapped around the ends of the gum rubber layer to prevent sticking of the layer 88 at the ends so that this layer may be trimmed. The individual cords embedded in and reinforcing the strip material 88 are disposed at an angle of from about 40 degrees to about 50 degrees, preferably in the neighborhood of 45 degrees to the longitudinal axis of the mandrel or form F. When the first layer of cord reinforced rubber sheet material is wrapped about the form its edges are joined together in a lap indicated at 97, Figure 12. This lap may extend axially along the form in parallel relation to the rotational axis of the latter, but preferably extends in a spiral about and along the length of the form following the cord angle as is customary in the making of a lap joint in a layer or ply in the building of a conventional pneumatic vehicle tire.

Upon completion of the first ply material layer 101 a second ply material layer 102 is drawn onto the form F in superimposed relation to the first sheet material layer and with reversed cord angle by rotating the form in a direction opposite to the rotational direction used in drawing the first layer thereon. If, for example, the first sheet material layer 101 is drawn onto the form F by rotating the latter in a clockwise direction, as viewed in Fig. 2, the cord-reinforced sheet material moves onto the top of the form over the path indicated by the full lines of that figure. The second layer of sheet material is then drawn onto the drum by rotating the latter in a counterclockwise direction (Figure 2) over the path between the guide roll 89 and the bottom of the form indicated by the broken lines of Figure 2. A seam or lap joint 105 is formed in the second sheet material layer 102 similar to the lap joint 97 formed in the first layer 101. Third layer 103 of cord reinforced sheet material is then drawn onto the form F about the second layer 102 and is followed by fourth layer 104. The third layer is drawn onto the form in the same direction as the first layer and the fourth layer is drawn onto the form in the same direction as the second layer to provide a construction in which the cords are reversed or alternate in direction in successive layers. This follows the established practice in using multiple layer cord reinforced sheet material as known in pneumatic vehicle tire manufacture. Lap joints or seams 106 and 107 are formed in the third and fourth plies and are similar to the second layer lap joint 105 and the lap joint 97 described in connection with the first sheet material layer.

At the ends of the form F the sheet material layers 101, 102, 103 and 104 are each trimmed to the substantially parallel line continuously curved contours shown in side elevation in Figure 5, the sheet material layers on the opposite sides of the form being trimmed to the same contours as shown for the near side. It has been found satisfactory to mark the sheet material layers individually with chalk while supported in cylindrical shape by the form F, using flexible templates of metal or cardboard which are held against the cylindrical surface of the sheet material. The cutting or trimming to the marked contours is then accomplished by a knife or shears, such trimming being done on the individual sheet material layers as they are laid up on the form or in a subsequent operation in which the lap joints are opened and the outer sheet material layers are peeled back from the ends of the form while the underlying layers are trimmed. Alternatively, the untrimmed cell blank can be first removed from the form, the sheet material layers marked individually in flattened condition by means of the templates mentioned, and then trimmed to the curved contours shown. It is also feasible to apply the chalk contour markings one at a time as the sheet material layers are built up on the form and to trim the ends subsequently after withdrawal of the cell blank from the form. If rags are employed to facilitate trimming as aforementioned, they are pulled out and removed after the trimming operation. The second sheet material layer 102 has a curved edge 112 which overlaps and extends axially of the form beyond curved edge 111 of the first sheet material layer 101 and is in turn overlapped by curved edge 113 of the third layer 103. The fourth sheet material layer 104 has a curved edge 114 which extends axially beyond and overlaps the curved end edges of all of the underlying sheet material layers. In the staggered end edge construction thus provided the curved end edge of each sheet material layer except the outermost layer is embraced by a cord layer and held thereby against the layer of rubber lining material 92. The continuous parallel curves of the end edges 111–114 avoid stress concentration in the end closure structure of the cell and obtain a joint of smooth contour substantially free of objectional bulkiness and stiffness. Each of the curved end edges is in the form of a double ogee curve since the direction of curvature is changed at each side of the cell where the edge sweeps about apices 116 at the ends of the U-shaped side reliefs cut into the rubber liner material 92.

A cover layer 115 of raw or partly cured rubber compounded for toughness and wear resistant characteristics (for example, neoprene) is applied to the outermost layer 104 of the cord reinforced sheet material layers after the latter have been wrapped about the mandrel F and either before or after the ends of the sheet material layers have been trimmed to the parallel curve contours described. The cover sheet 115 is discontinuous at and across the ends of the cell blanks, terminating short of the cell ends substantially along the end line indicated at 117, Figure 5, to leave the cord material layers exposed for direct contact with the cord reinforced strips employed in making the end closures. The cover layer 115 is also discontinuous across the bottom of the lower mandrel half 81, terminating substantially along parallel longitudinally extending edges or lines 127 to permit direct contact between the outer cord material layers 104 of the cells C' and C'' when the cells are assembled together. As will later appear, a reinforcing strip 144 is inserted in the joint between the cells, this strip being U-shaped in section and having parallel edges that abut the cover strip edges 127 of the two cells. The cover strip 115 may also be discontinuous across that portion of the cell on the top of the upper form half 80 for direct contact of the outer layer 104 of the cord reinforced sheet material of the cell against the channel pan of the cushion assembly, or, as shown, the cover sheet may be continuous across the top of the form F from one side to another of the cell blank to provide a layer of cushion rubber between each cell and its corresponding channel pan.

While the open ended cylindrical cell blank is supported by the tubular mandrel F a number of apertures are cut or formed in the cell blank walls. These apertures are located by openings provided for the purpose in the halves 80 and 81 of the form or mandrel F. Since the same mandrel or form is or may be used in building both cells of the cushion assembly, the form is provided with different sets of these aperture locating openings. In building the cell blank for the cell C', an opening 108 centrally located in the form half 80 and axially spaced openings 109 in the form half 81 locate an aperture 98 on the top centerline and apertures 99 on the bottom centerline of a cell blank, the aperture 98 being provided to receive and locate the air stem 22 and the apertures 99 being those which are registered with corresponding apertures in the cell C'' to constitute the intercommunicating air passages 23. The upper mandrel half 80 is also formed with holes or openings 110 spaced axially along the length of the cell blank for locating cell blank apertures 100 that receive and locate the internally threaded stems 24 in assembly. The holes or openings 109 in the lower form half 81 are used in locating the intercommunicating apertures 99 in the cell blank for the bottom cell C'' that are aligned with the correspondingly formed apertures in the cell blank for the upper cell C' to constitute the cell connecting air passages 23.

Upon completion of curved or contoured end edges on the sheet material layers and the formation of the openings for the cell connecting passages and the inflation stem 22 (for the threaded stems 24 in the case of the blank for cell C''), the operations on the cylindrical form or mandrel F are completed and the cell blank, now in the form of a substantially cylindrical open ended tube, is removed from the forming mandrel F for further processing. To facilitate the removal and to clear the shaft 85 so that a second form identical to the form F can be placed on the shaft immediately for the building of the next cell, the form, carrying the open ended cell blank, is withdrawn axially from the cantilever shaft and placed on a bench or other suitable support. Removal of the screws 83 and the rings 82 by suitable implements inserted through the open ends of the form permits the form halves 80 and 81 to be relatively shifted laterally into offset relation and the form partially collapsed to reduce its circumference, as shown diagrammatically in Figure 12. In practice, of course, the upper of the two form halves, upon removal of the shape retaining rings 82 from the form, drops by gravity as soon as the confronting edges of the form halves are displaced from alignment, the upper form half then resting upon and being supported by the lower form half. The cell blank and the collapsed form are then separated by relative axial movement.

As a preferred arrangement the cell blank is moved directly from the collapsed halves of the forming mandrel F axially over and onto, in telescoping relation, supplemental cantilever support or mandrel 118. The supplemental mandrel 118 may comprise a long metal member or plate having a width less than the diameter of the cylindrical cell blank. A stiffening rib 119, tapered along its length, is welded or otherwise secured to the bottom of the plate. The plate mandrel 118 and the stiffening rib 119 are welded or otherwise secured at one end to a plate 120 suitably supported as on a post or pedestal structure 121 so that the supplemental mandrel extends horizontally from the support in cantilever fashion, permitting the cell blank to be drawn axially thereon over free end 122 of the mandrel.

At intervals along the length of the supplemental mandrel, corresponding to the spacing between the cushion blocks 75 and 76, the plate 118 is apertured to provide sockets 123 into which the loose rubber blocks are fitted before the cell blank is drawn onto the supplemental mandrel. Cups 124 disposed beneath the sockets 123, being supported in cutouts or notches in the reinforcing rib 119, give full support to the rubber blocks to prevent objectionable deformation of the latter when subjected to assembly pressure.

The supplemental mandrel 118 is also formed on its upper face with recesses or sockets for the stems 22 and 24. In Figure 6 the socket for the air inflating stem 22, employed in assembling the cell C', is indicated at 125 and the socket for one of the threaded stems 24, employed in assembling the cell C'', is indicated at 126. The socket 125 is contoured to fit rubber base flap 128 (Figure 10) of the air inflating stem 22, such base flap being of tapered or generally frusto-conical shape.

The open-ended cell blank shown in Figure 6 becomes the cell C', the upper of the two cells shown in the cushion assembly. The lower cell C'' of the cushion assembly is made in a similar way from a similar open ended cell blank except that in lieu of the air inflating stem 22 the internally threaded stems 24 are supported in sockets in the upper surface of the supplemental mandrel 118 to locate the stems 24 in predetermined axial relation to the blocks 75 and 76 and in alignment with such blocks. The threaded stems 24 have circular rubber base flaps 129 similar to the base flap 128 of the air inflating stem 22 and the mandrel sockets for the flaps 129 are suitably contoured to receive the latter. By employing the same set of sockets 123 for locating the cushion blocks 75 and 76 of the bottom cell C'' as are used to locate the blocks of the upper cell C' of the cushion it is assured that the blocks of the two cushions are aligned with one another and are disposed in bearing relation in the completed cushion assembly.

The stem sockets and the sockets 123 for the rubber blocks 75 and 76 are so located along the length of the supplemental mandrel 118 that an open ended cell blank drawn over the mandrel and positioned thereon as in Figure 6 with the stem 22 (or the stem 24) projecting through the hole or aperture 98 (or the aperture 100) previously formed therefor in the wall of the cell blank while the latter was on the form mandrel F, receives the blocks 75 and 76 previously positioned in the sockets 123 in correct predetermined axial spaced relation along the length of the cell blank walls, the blocks being thus located in axial alignment with one another and with the stem 22. With the cell blank thus positioned on the supplemental mandrel in predetermined axial relation by reason of the locating action of the cell aperture 98 receiving the stem 22 (or the cell apertures 100 receiving the stems 24), pressure is applied against those portions of the cell blank walls overlying the cushions 75 and 76 and the base flap 128 of the air stem 22 (or the base flaps 129 of the threaded stems 24) to effect an adhesive bond between these parts and the tacky inside surface of the gum stock 92 lining the tubular cell blank.

To insure strong adhesion of the blocks and the stem base flaps against the cell walls it is preferable to paint or otherwise treat one or both of the surfaces that are to be brought into contact with a suitable bonding agent such as rubber cement. The blocks 75 and 76 may, for example, be sprayed or painted with rubber cement before or after they are placed in the sockets 123 and before the cell blank is drawn axially over the supplemental mandrel. The upper faces of the stem base flaps 128 and 129 may also be treated with rubber cement in the same way in a preliminary operation preceding the movement of the cell blank over the supplemental mandrel.

To retain the stems 22 and 24 in position in the sockets or recesses 125 and 126 during the movement thereover of the tubular cell blank, upstanding pins, not shown, are located in the sockets, the pins being secured to the mandrel and disposed to project axially into the stems 22 and 24. To withdraw the stems after assembly with the cell blanks the stems are either lifted off the locating pins or the latter are withdrawn from the axial openings in the stems by well-known mechanisms.

After the spacing cushions 75 and 76 and the base of the stem 22 (or the stems 24, as the case may be) have been located and pressure bonded to the inside surface of the cell blank wall the latter is withdrawn axially from the cantilever supplemental mandrel 118, the spacing blocks and stem bases being raised out and freed from the locating sockets prior to the withdrawal. At the time of withdrawal, that is, immediately before or immediately after, the inside of the cell blank is treated with a suitable anti-adhesion agent such as soapstone which may be blown or dusted against the walls of the cell to prevent the gum stock walls from sticking together. Prior to such dusting with soapstone or other anti-adhesion agent the apertures 99 previously formed in the cell blank walls while the cell blank was on the forming mandrel F, such apertures having been located at the openings 109 in the form half 81, are reinforced or bound by gum rubber stock 131. This gum stock may be supplied in the form of a cylindrical tube, the outline of which is indicated by broken lines 132, Figure 8. This gum rubber tube is inserted in the aperture 99 to the broken line position indicated, the outer surface of the tube and the material of the cell wall around the aperture having first been treated with a suitable bonding agent such as rubber cement. The edges of the gum stock tube are then flanged radially outwardly as by manual manipulation to lie against and embrace the material of the cell wall about the opening.

When the two tubular cell blanks that are to constitute the cells C' and C" of a cushion assembly have progressed to this stage of completion they can be completed individually as separated cells by forming the end closures thereon and then assembled together, or (and this is the preferred procedure since it permits inflation of the cells without plugging the apertures 99, as will later appear) the two cell blanks are pressed against one another in parallel relation with their reinforced openings 99 in registry to define the intercell passages 23. This juxtaposition of the cell wall openings for one of the passages 23 is shown diagrammatically in Figure 9, which illustrates the manner in which the two ringlike reinforced gum stock bindings 131 surrounding the aligned tube apertures come together at the common passage and are thus in position and condition to flow together in the formation of an integral one piece homogeneous gum rubber liner for the passage 23 during the subsequent curing process. The surfaces of the two tubular cell blanks around the apertures 99 are treated with rubber cement or the like and pressed together to hold the cell blanks in assembled relation during subsequent handling and end closure construction.

Figure 19:
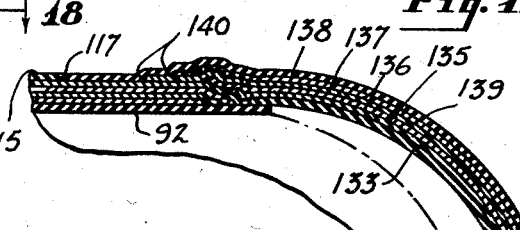
Figure 19 is a fragmentary horizontal sectional view diagrammatic in character, taken substantially along the line indicated at 19—19 of Figure 18.
Figure 20:
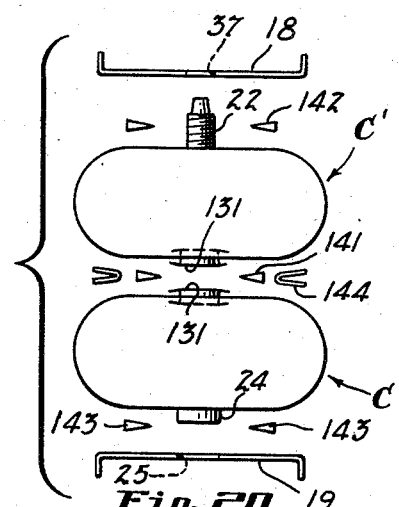
Figure 20 is a diagram representing the relative position of the component parts comprising one of the cushions.
Figure 21:
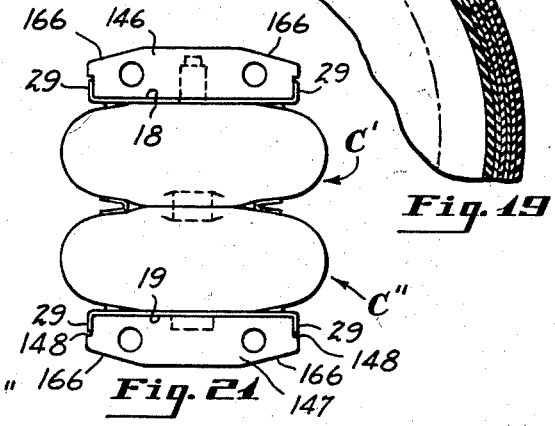
Figure 21 is a diagram representing a transverse sectional view through a cushion assembled from the components shown in Figure 20, the confining bars or rails of the mold being shown in position.
Figure 23:
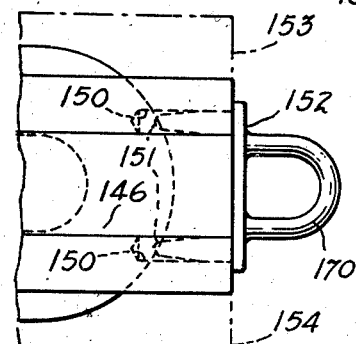
Figure 23 is a partly diagrammatic elevational view of one end of the structure shown in Figure 22.

After withdrawal of the tubular cell blank from the supplemental mandrel 118 and either before or after the two cell blanks that are to comprise a cushion assembly have been placed together, the ends of the cell or cells are closed. The closure is made with the cell or cells supported in a flattened cell being shown diagrammatically in Figure 13. The curved end edges of the cord reinforced sheet material layers are in staggered or offset relation, the outer layers projecting axially of the cell blank about ¼" to about ½" beyond the next adjacent underlying layer and the overlap being substantially uniform about the entire periphery of each cord material layer. The sealing gum stock layer 92 on the inside of the cell wall projects axially about one inch beyond the outer or longest of the cord reinforced sheet material layers permitting margins of this projecting gum stock to be pinched together in the provision of a primary seal for the cell blank end. The bonding together of the gum stock edge margins may be improved by the use of rubber cement or other adhesion agent and care is taken in applying the soapstone previously mentioned to protect the end edges of the gum stock liner. A binding strip 133 of gum rubber stock, as shown in section in Figure 14, is manipulated to U-shape and wrapped about the pinched together end edges of the gum stock liner 92. The edges of the gum stock strip 133 extend axially along the sides of the cell blank beyond the apices 116 so as to effectuate a complete seal about the entire length of the semicircular joint between the end edges of the gum stock liner 92. A series of reinforcing strips are then wrapped about the semicircular end of the cell blank, these strips being of rectangular shape and comprising cord reinforced rubber sheet material in which the cords are disposed at about 15 degrees to the transverse axis of the strip (or about 75 degrees to the longitudinal axis of the strip). The first strip, indicated at 135, is applied over the gum stock sealing strip 133 and is the narrowest and shortest of the cord reinforced fabric binding strips. It extends in overlapping relation to the edges of the outermost layer 104 of the sheet material comprising the body of the cell. The second fabric binding strip, indicated at 136 and wider and longer than the first binding strip, extends beyond the edges and ends of the latter and overlaps both the outermost layer and the second outer layer 103 of the body sheet material. In a similar manner the third and fourth fabric binding strips indicated at 137 and 138, respectively, are wrapped about the semicircular cell blank end, each successive strip being wider and longer than the preceding so that the fourth or outermost strip 138 extends beyond all of the staggered end edges of the sheet material layers of the cell body and thus overlies all of the body sheet material layers. A cover layer 139 of tough wear resistant rubber composition, such as neoprene or the like, is placed over the superposed layers 135–138 of the end closure, this cover sheet being of the same composition as the cover sheet 115 on the sides of the cell and abutting the end edge 117 of the side cover sheet as shown in Figure 19. If desired the cover layer 139 may be replaced by neoprene heels 186 and neoprene strips 199 as shown in Figures 35 and 36.

Figure 28:
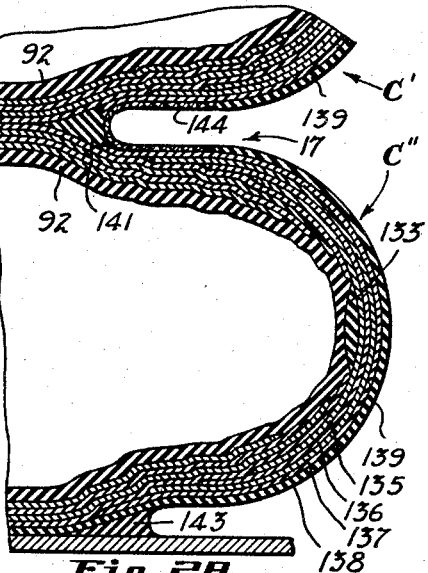
Figure 28 is a diagrammatic sectional detail through the end of the cured cushion, this view being taken in a plane paralleling the longitudinal axis of the cushion to show the relative positions of the cord material layers or plies in the tubular cell body and in the end closure, this view corresponding to Figure 18 of the illustrations showing the uncured or unmolded cell.
Figure 29:
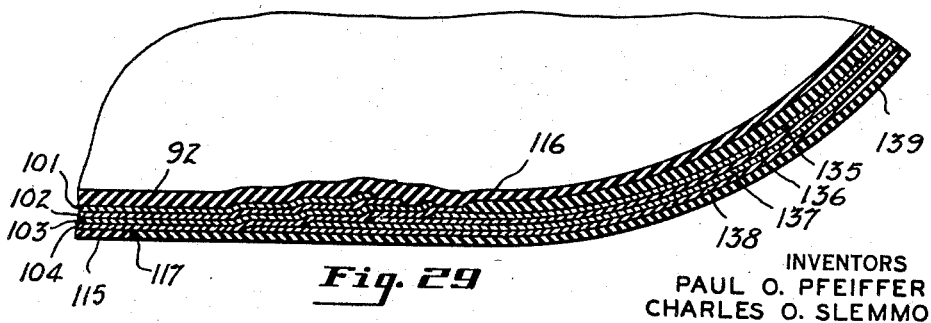
Figure 29 is a diagrammatic horizontal sectional detail corresponding to Figure 19 of the series showing the cushion cell prior to molding to show the side wall joint between the tubular cell body and the end closure upon completion of the molding operation.

In addition to the overlapping arrangement of the side marginal edges of the binding strips 135–138 these strips are overlapped or staggered at their end edges 140 to provide at the sides of the cells over the apices 116 of the semicircular ends tapered joints between the several layers of cord reinforced sheet material comprising the body of the cell and the several binding strip layers that embrace the semicircular seal at each end of the cell. The binding strips 135–138 and the underlying gum rubber strip 133 constitute an end closure for the cell which, as appears in Figs. 28 and 29 showing the cushion after molding, is tapered in thickness along both the top and bottom semicircular marginal edges and also along both side edges which overlap the cell end apices 116 and extend axially along the cell sides.

Building up of the closures on the ends of the tubular cell blanks described above as a procedure following the attaching together of the two-cell blanks which are to comprise the upper and lower cells C' and C" of the cushion assembly may, in an alternative procedure, be accomplished before the cells are joined together at the connecting apertures 99 to form the intercommunicating passages 23. A certain advantage may be obtained by effecting the primary seals at the ends of cell blanks before the cord reinforced binding strips 135–138 are assembled on the ends of the cells. The primary seals, obtained by pinching and adhering together of the semicircular marginal end edges of the raw gum rubber 92, permit partial inflation of the cells through the stem 22, the stems 24 being plugged (and also the openings 99 in the event the end closures are constructed on the cells before the cells are assembled together). In the partially inflated condition, the inflation being insufficient to separate the spacing blocks 75 and 76 from the opposing walls of the cells, the binding strips 135–138 are placed and shaped to the contours of the cell ends more easily and accurately than in the case of the wholly uninflated cell blank. The separation of the cell blank walls by partial inflation also prevents the walls from bonding together.

Upon completion of the end closures and the securing together of the cells C' and C" with the apertures 99 in registry the cell pair is placed between the upper and lower channel pans 18 and 19, the cushions being located relative to the pans by the interfitting relation of the stems 22 and 24 in the openings 37 and 25 for these stems previously formed in the pans in predetermined locations. The cell-engaging surface of each of the pans 18 and 19 is treated with a suitable metal-to-rubber bonding agent over an area of predetermined extent, this area constituting a tapered bonding zone to be later described.

In the bight or apex angle where the cells C' and C" come together a filler strip 141 is inserted to provide a tear resistant cove joint between the cushions. Filler strips 142 and 143 are inserted in the joints between the upper and lower cells and their respective attaching pans. Each of the filler strips is wedge shaped in cross-section and is annular in extent or continuous about the entire periphery of the bonding zone defined by such strip between the cells or between one of the cells and one of the channel pans. In the bight or angle between the two inflatable cells a reinforcing strip 144 of cross woven rubberized fabric may be inserted, this fabric strip being bent or folded to U-shape in cross-section so as to bridge the joint across the filler strip 141 thereby connecting the outer surfaces of the walls of the two cells along the margins of the bonding zone. As previously mentioned, the wear resistant rubber covering 15 may be discontinuous across the bonding zone between the two cells, preferably terminating adjacent or in abutting relation to the edges of the cross woven fabric binding strip. The placement of the filler strips 141–143 and the fabric connecting strip 144 is facilitated by the use of suitably contoured jigs which hold and locate these strips in desired positions relative to the pneumatic cells and the channel pans while internal pressure and localized external pressure is applied to bond the parts together sufficiently for manipulation and handling in placing the assembled cushion in a mold for curing. The usual bonding agents or cements are utilized on the filler connecting strips and on the cushion and channel surfaces to which these parts are to be attached to hold the several parts together when bonded by pressure.

The cells and channel pans of the cushion assembly when assembled together in desired relative positions and held by bonding agents comprise an unwieldly structure that is difficult to handle and which is subject to damage as by dislocation or separation of parts. To facilitate the handling of the uncured cushion assembly it is enclosed in a confining, preferably open sided, frame and inflated as by air to a pressure sufficient to hold the parts in assembled relation and to prevent separation of the seams and joints. The confining frame comprises a pair of metal bars 146 and 147 which are disposed in spaced generally parallel relation, the bar 146 being received between the flanges 29 of the channel pan 18 and the bar 147 being received between the flanges of the channel pan 19. The bars or rails 146 and 147 have confronting surfaces that are received flatwise against the outer faces of the channel pans to reinforce the relatively thin channel pans against deformation or damage as by warping under the high internal pressures used during the molding operation. The bars or rails 146 and 147 thus constitute supplemental molding members, as will appear, and are formed with reliefs or rabbets 148 along their opposite side edges to receive the flanges 29 of the channel pans.

At their ends the supplemental molding members 146 and 147 are formed with axial sockets 150 which receive spaced parallel pins 151 secured to and projecting outwardly from connecting members or jigs 152. These jigs each extend between the supplemental molding members and are located at the opposite ends of the latter. They thus constitute end connectors which hold the supplemental frame members 146 and 147 in predetermined parallel relation. An enclosing frame is thus provided for holding the cushion assembly while the latter is placed between the mold halves. The supplemental mold members 146 and 147 extend slightly beyond the ends of the channel pans 18 and 19 of the cushion assembly (see Fig. 24) so that the connecting members or frame elements 152 are located wholly beyond the ends of the cushion assembly, leaving the sides of the latter clear and unobstructed for placement between mold sections for curing.

A suitable curing mold comprises sections 153 and 154 in combination with the members 146 and 147. These main mold members or sections have confronting faces suitably contoured to define a cavity of the desired two-cell cushion shape. Each main mold section extends the full length of the cushion assembly and beyond the ends thereof as shown in Figs. 24 and 25. Approximately half of the mold cavity is formed in each of the mold halves, the two halves being piloted together and held in registry by suitable pins 156 and sockets 157, the pins being carried by the mold section 154 and extending through the parting plane indicated by line 158, and into the recesses in the mold section 153. The stems 22 and 24, received in apertures 159 in the supplemental mold members 146 and 147 are utilized for inflating the cushion assembly during curing and for circulating steam through the interiors of the cells during the curing cycle. A gas such as carbon dioxide is supplied under pressure to the cushion while the latter is confined in the mold by connection of a suitable conduit 160 from a suitable source to the stem 22, the usual check and control valves being inserted in the line. Steam under pressure is supplied to the cushion as required by the curing system employed through conduits 161 connected to the stems 24, one such conduit being a steam supply conduit and the other being a return steam conduit.

Figure 22:
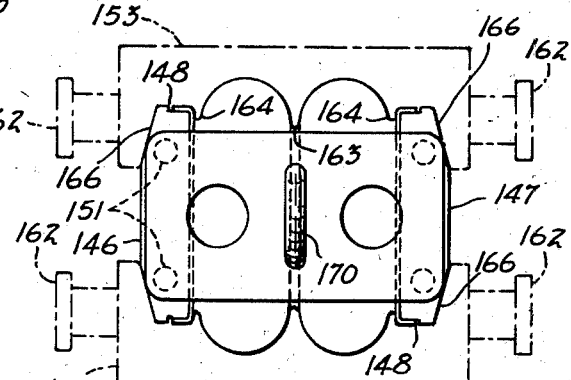
Figure 22 is a partly diagrammatic end view of the cushion and the mold rails showing one of the fixtures for engaging the ends of the rails to locate the latter in predetermined spaced parallel relation, the mold halves being shown in broken outline.

To place the cushion assembly in the mold, the assembly confined by the four-part enclosing cage or frame comprising the end connectors or jigs 152 and the supplemental mold members 146 and 147 and expanded by the internal pressure within the cells C' and C'', is lifted as a unit by a suitable hoist or crane for placement between the main mold sections, connection being made through a suitable sling provided with hooks that engage integral loops or rings 170 extending axially from the connecting elements 152 of the confining four-piece frame. The balance or equilibrium of the assembly is such that when suspended from a sling in the manner described the cushion and the confining frame are disposed substantially in the position shown in Fig. 22, the supplemental mold members 146 and 147 being at approximately the same horizontal level. The hoist or crane from which the cushion assembly is thus sustained may be then manipulated to locate the assembly over the mold section 154 indicated in broken lines in Fig. 22 and which is supported on a horizontal surface with its cavity-defining wall facing upwardly so as to receive one side of the cushion assembly as the latter is lowered into position. The other mold section or half 153, indicated by broken lines in Fig. 22, is then placed on the cushion assembly in matching relation to the previously placed mold section 154. The mold sections are conveniently carried and manipulated by conventional slings that are connected to knobs 162 which project over opposite sides of the mold halves or sections.

Figure 26:
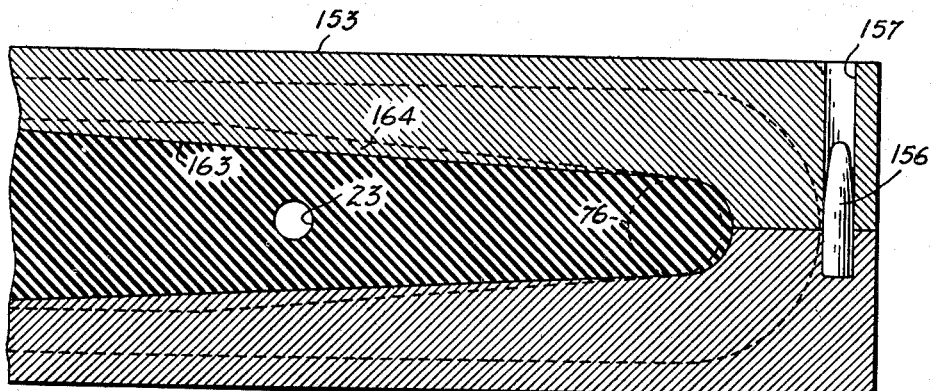
Figure 26 is a partly diagrammatic fragmentary view representing a section taken longitudinally through one end of the mold to show the tapered zones of connection between the cushion cells and between the cells and the respective channel pans.
Figure 27:
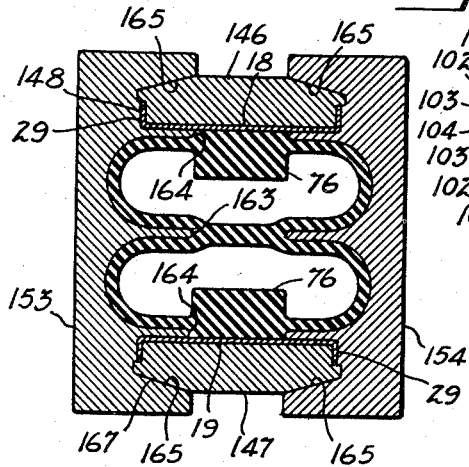
Figure 27 is a partly diagrammatic transverse sectional detail through the mold showing the assembled cushion in curing position, this view being taken substantially along the line indicated at 27—27 of Fig. 24.

The cavity-defining faces of the main mold halves or sections 153 and 154 are each formed with a longitudnially extending central rib 163 and marginal ribs 164 which parallel the central rib. These ribs define the bonding zones or areas between the cells C' and C'' and between the cells and the channel pans 18 and 19. The ribs are accordingly tapered in plan form as shown in Figs. 25 and 26 to provide the desired tapering of the attachment areas or bonding zones. The taper of the ribs 163 which define the bonding zone between the cushion cells differs from the taper of the ribs 164 which define the bonding zones between the cells and the channel pans so that the bonding area or zone 17 between the cells is of less extent than the bonding area or zone between each of the cells and the channel pan to which it is connected, the zone 17 being generally narrower and somewhat shorter than the tapered zone between the metal channels and the cells.

The side edges of the rail or supplemental mold members 146 and 147 are received in parallel recesses 165 formed in the confronting faces of the main mold sections 153 and 154. These recesses are tapered in depth, one side of each recess being defined by one of the longitudinally extending mold ribs 164 which establishes the limits of the bonding zone between one of the cushion cells and the channel pan to which such cushion cell is attached and the other side of each recess being inclined at an acute angle to the plane of relative movement of the mold members in closing about the cushion structure.

The supplemental mold members 146 and 147 are formed with inclined faces 166 which match the inclined walls of the recesses 165 in the main mold members so that in the completely assembled mold the side walls of the recesses 165 meet the inclined faces 166 of the supplemental mold members along parting lines 167, which are at an acuate angle to the plane of relative closing movement of the main mold members.

Suitable mold embracing clamps, not shown, are locked in embracing relation about the sections 153 and 154 to hold the mold together when subjected to the high internal pressures used in the curing process, or connecting links can be used between the knobs 162 of the two mold sections.

With the assembled cushion structure confined in the molding cavity by the matched mold halves 153 and 154 and by the parallel members 146 and 147 which are received in the recesses 165 of the mold pans and serve as spacers for the latter, the rubber is cured by placing the entire mold assembly and the enclosed cushion structure in an open steam autoclave or curing chamber. As a preliminary treatment to adjust the cushion assembly to the mold and to compact together the several layers of cord reinforced sheet material and the gum rubber stock which comprise the cushion, carbon dioxide or other inert gas is first introduced into the cells through stem 22 at a pressure of about 200 pounds per square inch for a period of about 8 to 12 minutes, 10 minutes being satisfactory in general practice. With this preliminary inflation treatment the subsequent steam curing results in a dense wall structure of substantially uniform thickness.

After exhausting the carbon dioxide gas from the interior of the cushion assembly, steam at about 85 pounds gage pressure is introduced into and passed through the cell chambers as by the conduits 161 and suitable fittings attached to the stems 24. This heating of the cushion by live steam introduced internally is maintained for a period of about 8 to 12 minutes, 10 minutes being satisfactory. The entire mold assembly and the cushion assembly contained therein are subjected to the open steam treatment in the autoclave for about 25 to 35 minutes, 30 minutes being satisfactory, the steam being maintained at about 40 pounds pressure and at a temperature of about 280° F. to about 300° F. The external steam treatment may include not only the period during which the 85-pound steam is circulated through the interior of the cushion assembly but also the preliminary period during which the 200 pound carbon dioxide is maintained in the cushion. It is essential, of course, that when subjecting the cushion to the pressurized steam in the autoclave and in changing from carbon dioxide to steam that the internal pressure in the cushion be maintained above the 40 pounds gage or other pressure of the open steam in the autoclave.

After the internal steam treatment and while the mold remains in the autoclave, internal pressure is maintained in the cushion cells by inert gas such as carbon dioxide at about 200 pounds gage pressure. This is contained for about two hours after the steam has been turned off in the autoclave. Upon removal from the autoclave and release of the internal pressure, the mold with the cured cushion assembly therein is sprayed with faucet water at room temperature for about five minutes to cool both the mold and the cushion.

A substantial amount of time is required to trim the rounded end portions of the fabric plies in the pneumatic cushion described above. Figures 30 to 38 show a modified form of the invention wherein such end portions are separately cut prior to mounting on the ends of the cell so as to minimize the time required to form each cell.

Each cell is made on a split building form F' similar to the form F described above which is supported in cantilever fashion on a shaft or bar 170 carried by the rigid support 171. The form F' is in the form of a collapsible cylindrical mandrel 169 of uniform length which may be rotated in opposite directions by a suitable motor to apply the fabric.

The collapsible building form F' is assembled and mounted on the shaft 170. A three-quarter inch stripe of cement is then painted the full length of the form along a designated scribe line on the top of the form. The starting edge of an extruded rectangular strip of gum stock is then applied to the mandrel at the cement stripe and wrapped around the form so as to make a tube 172 with a splice or lap joint 173 having a uniform width not less than one-half inch, the strip being centered on the mandrel as shown in Fig. 30. The tube 172 is then washed lightly by swabbing with a solvent.

A guide line may be drawn parallel to the splice 173 for the full length of the tube, said guide line preferably being about two and one-half to three inches from the splice. A first ply 174 of bias-cut rubberized fabric is then applied starting with the fabric edge at said guide line, the fabric also being centered on the mandrel as shown in Fig. 30. The fabric ply is wrapped around the tube 172 and overlapped to form a splice or lap joint 178 of uniform width. The first fabric play is then lightly swabbed with solvent and allowed to dry. A second ply 175 of bias-cut rubberized fabric is then wrapped around the first ply and overlapped to form another splice or lap joint 179 spaced from the splice 178 as shown in Fig. 32. The mandrel 169 is rotated in one direction when the first play 174 is applied and is rotated in the other direction when the second ply 175 is applied so that the two fabric plies have opposite bias angles. The second ply is then lightly swabbed with solvent and allowed to dry. A third ply 176 is then applied by rotating the mandrel 169 in the same direction as during application of the first ply 174, so that the bias angle of the third ply is the same as that of the first ply. The side edge portions of the third ply are overlapped to form a splice or lap joint 180 spaced from the joint 179. After the third ply has been swabbed with solvent and dried a fourth ply 177 of bias-cut fabric is applied, rotating the mandrel 169 in the same direction as during application of the second ply, so that the bias angle of the fourth ply is the same as that of the second ply. The side edge portions of the fourth ply are also overlapped to form a splice or a lap joint 181 spaced from the joint 180 and the joint 173 as shown in Fig. 32. Wherever air is trapped between plies, an awl may be used to puncture the play and to remove the air. After the plies are applied they are rolled and stitched together during rotation of the mandrel. The fourth ply is then washed with solvent and allowed to dry.

The circumferential end edges of the plies 174 to 177 are staggered or offset as shown in Figs. 31 and 32. If desired all of the fabric layers may be of the same axial length and stepped in different ways at the opposite ends of the mandrel; but, as herein shown, the fabric strips are of different lengths. The first ply 174 is at least about one-half inch longer than the second ply 175, which in turn is at least one-half inch longer than the third ply 176. The fourth ply 177, likewise, is at least one-half inch longer than the third ply 176. All the rubberized cord-reinforced plies are centered on the mandrel so that each ply has an end edge which is spaced about one-quarter to one half inch from the end edge of the underlying ply. Each end edge of the tube 172, however, is spaced at least about three inches from the nearest end of the inner ply 174.

In order to reinforce the end portions of the tube 172, four heel-shaped five-layer cord-reinforced rubber patches D are formed, the patches being pre-cut, using suitable dies and assembled as shown in Fig. 33 before they are applied to the end portions of the tube 172. Each patch D comprises a first heel-shaped sheet or patch 182 of bias-cut rubberized fabric, a second heel-shaped sheet 183 of bias-cut fabric having cords crossing the cords of the sheet 182, a third heel-shaped sheet 184 of bias-cut fabric having cords parallel to those of the sheet 182 and crossing those of the sheet 183, and a fourth heel-shaped sheet 185 of bias-cut fabric having cords parallel to those of the second sheet 183 and crossing those of the sheet 184. The sheets 182 to 185 progressively increase in size as shown in Fig. 33, the marginal edges of the sheets being D-shaped and parallel so that the sheets are offset uniformly. The marginal edge of each sheet is preferably spaced about one-quarter to one-half inch from the marginal edges of the adjacent sheets. The rounded marginal edges of the sheets are shaped so that the finished cell will have semi-circular ends. Each of the patches D includes a small heel-shaped outer layer 186 of a suitable rubber compound, such as neoprene, which is compounded for wear-resistance and resistance to deterioration due to sunlight or contact with oils and greases.

The five layers 182 to 186 are adhered together to form the patches D as shown in Fig. 33 before they are applied to the tube 172. It will be apparent that very little time is required to apply four of the patches D to the cell on the form F'. Only one or two minutes are required to apply the tube 172 and the rubber and fabric layers 174 to 178 to the mandrel and to apply the four patches D. The patches D are applied to each end of the tube 172 as shown in Fig. 34, one patch D being centered on the top of the mandrel and the other patch D being directly below the first patch and centered on the bottom of the mandrel. The two patches are wrapped around the mandrel and pressed against the tube 172 so they will stick thereto. The edges of the larger heel-shaped fabric sheets 185 may contact at the sides of the mandrel, but as shown herein in Fig. 34, the edges are spaced apart about one-quarter of an inch.

The parallel straight marginal edges of the sheets 182 to 185 are staggered axially of the cell substantially the same as the circumferential edges of the fabric layers 174 to 177, so that the heel-shaped patches D may be applied as shown in Fig. 36. As shown in that figure, the heel-shaped fabric patch 182 extends over the end of the adjacent inner fabric ply 174 and is spaced less than one-sixteenth inch from the end of the second fabric ply 175 so as to form a lap joint 190. The second patch 183 extends over the end of the adjacent second ply 175 in a similar manner to within less than one-sixteenth of an inch of the third ply 176, so as to form a lap joint 191 similar to the joint 190. The third and fourth patches 184 and 185 overlap the third and fourth plies 176 and 177 the same amount as the first and second patches 182 and 183 overlap the first and second plies 174 and 175, so as to form lap joints 192 and 193 similar to the joints 190 and 191. After the patches D have been applied to both end portions of the tube 172, they are rolled and stitched so that they adhere to the tube 172 and the fabric plies 174 to 177. Thereafter, the mandrel 169 is rotated and a rectangular cover strip 198 is wrapped around the outer fabric layer 177, said cover strip extending all the way around the mandrel and overlapping itself and the inner end portions of the four heel-shaped cover patches D.

The opposite end portions of the tube 172 may then be cut to form rounded edges 188 parallel to and spaced about one-quarter inch from the rounded edges 187 of the rubberized fabric patches 185 as shown in Fig. 34. The edges 188 may be formed by cutting the tube 172 while it is on the mandrel 169, or may be formed after the cell is removed from the mandrel. While the cell is still on the mandrel it may be marked to locate the grommet holes or any holes required for air fittings or valves. After the cell is marked, it may be removed from the mandrel.

A rubber block may be placed within the cell to limit collapsing thereof during drilling of holes in the cell for grommets or air fittings. Air fittings and rubber bumper blocks or the like may be applied to the cell as described above with respect to the air cushions of Figs. 1 to 29. Where bumper blocks are employed similar to the bumper blocks 75 and 76 described above, the surfaces of such bumper blocks may be roughened with a wire brush and washed with solvent. After the solvent is dried, cement is applied to the bumper blocks and they are pressed against the inner layer 172 of the cell and stitched thoroughly to the cell.

Where a two-cell pneumatic cushion is being built, it may not be necessary to drill holes in the wall of one cell which is to be joined to a metal channel. The corresponding wall of the adjoining cell, however, is usually drilled for at least one air fitting or the like. After drilling of the grommet holes, such holes are swabbed inside and out. Grommet stock is then inserted half way into the grommet holes, stretched out on the inside and outside and stitched down thoroughly. Thereafter, the ends of the tube are closed by pinching or crimping the rubber at the rounded edges 188 of the tube 172. Such crimping may be done using pliers, or may be done simultaneously with cutting of the edges 188, as where a die is used to flatten and pinch the ends of the tube 172 during cutting of the tube. After the ends of the tube are closed, narrow reinforcing strips 189 of gum rubber stock or tube stock are applied over the pinched ends of the tube 172, to reinforce the joint at 188. The strips 189 are stitched with a suitable roller at the ends of the tube as shown in Figs. 35 and 36.

After the rubber strips 189 are applied to the cell, the ends of the cell are reinforced with rectangular cord-reinforced rubber end strips 194 to 197 similar to the fabric end strips 135 to 138 of the first-described pneumatic cushion. As herein shown, the first fabric end strip 194 normally has a uniform width of three inches and a length of twelve inches before it is stretched around the end of the cell. The second fabric end strip 195 normally has a uniform width of four inches and a length of thirteen inches. The third fabric strip 196 normally has a width and length one inch greater than that of the second strip 195, and the fourth fabric end strip 197 has a width and length one inch greater than that of the third end strip.

Before the end strips are applied to the ends of the cell, the cell is preferably washed throughout with solvent and dried. The first strip 194 is stretched around the end of the cell in a symmetrical fashion as shown in Figs. 35 to 37 so that half of the strip is above the joint formed by the edges 188 and half is below the joint. The strip 194 has sufficient width so that it overlaps the marginal portion of the patch 182 and substantial portions of the patches 183 and 185 as best shown in Figs. 36 and 37. The second end strip 195 is then stretched over the strip 194. The third and fourth strips 196 and 197 are subsequently stretched over the end of the cell. All of the end strips are symmetrically arranged relative to the median plane of the cell and completely cover the rounded edges of the patches D and the joint formed by the edges 188 just like the end strips 135 to 138 of Fig. 15. The strips 194 to 197 are stretched and elongated substantially when placed around the ends of the cell and are rolled and stitched so that they adhere strongly.

After the fabric fourth end strip 197 is applied, the end of the cell is covered with a rubber compound, such as neoprene, which like the material of the cover strip 198 is compounded for resistance to deterioration by heat, sunlight and contact with oils and greases. The end covers may be the same as the cover 139 described above. However, it is preferable to employ the neoprene heels 186 and the rectangular neoprene strips or sheets to cover the end portions of the cell. As herein shown, the opposite ends of the cell are covered with rectangular end strips 199 which have a uniform width of about seven inches and a length of nineteen inches before they are applied to the cell. The strip 199 is stretched around the end of the cell and has sufficient width so that it completely covers the outer fabric end strip 197 and overlaps the curved marginal portions of the heels 186. The strip 199 also has sufficient length so that when stretched around the cell it overlaps the cover strip 198.

As shown in Fig. 35, the marginal edge of the heel 186 is a small fraction of an inch inwardly of the marginal edge of the outer fabric strip 197. The cover strip 199 extends over the heel 186 throughout the curved portion of its periphery to form a splice or lap joint 200 which has a U-shape as viewed in Fig. 35. The cover strip 198 overlaps the straight marginal portion of each heel 186 to form a splice or lap joint 201 as viewed in Fig. 36. The cover strip 198, the four heel-shaped patches 186 and the two end cover strips 199, therefore, completely cover the cell. However, it will be understood that the portions of each cell which will contact an adjacent cell or a metal channel, need not be covered with neoprene or other cover material.

After the cell is covered zinc stearate or other suitable material may then be inserted through the grommet hole and scattered throughout the cell using an air hose. The exposed surface of the grommets may be washed with solvent and roughened with a wire brush. Such surfaces may then be covered with a suitable cement and the top cell $C_a$ joined to the bottom cell $C_b$. The polyethylene covering on the channels 202 and 204 is then removed and the channels are painted with one coat of cement. Filler strips 206, after being washed with solvent and treated with cement, may then be applied to both channels and rolled and stitched thoroughly. The bottom of the bottom cell is coated with cement, allowed to dry, and mounted on the face of the bottom channel 204 away from the flanges 205. The top of the top cell is then coated with cement which is allowed to dry and is mounted on the top channel 202 away from the flanges 203, thus completing the uncured assembly.

It will be noted that the pneumatic cushion of Figs. 30 to 38 is substantially the same as the cushion of Figs. 1 to 29 except that the main fabric layers 174 to 177 are shortened and four patches are employed to replace the material lost by such shortening of the main fabric layers. After the fabric layers 174 to 177, the patches D and the cover layer 198 have been applied to the cell on the mandrel, an operation which requires no more than one or two minutes, the pneumatic cushion may be completed, using the method described with regard to Figs. 1 to 29. The fabric-reinforced cell on the mandrel 169 of Figs. 30 to 34, therefore serves the same purpose as the farbic-reinforced cell shown in Fig. 5, except that the fabric end portions of the cell are separate from, rather than integral with, the main fabric portion at the center of the cell between the end portions.

It will therefore be apparent how the pneumatic cushion of Figs. 30 to 38 may be molded. The method of molding may, for example, be the same as described above with respect to Figs. 20 to 29. After the cells $C_a$ and $C_b$ have been assembled with the channels 202 and 204, the completed uncured assembly is ready for molding. The mold is dusted lightly with coarse ground soapstone, excess soapstone being blown off. The side plates are placed at the top and bottom on the rear cell assembly. The air spring is then inflated just enough to permit insertion of the end plates. The air pressure is then released and the strip is loaded into the bottom of the mold, using a suitable spreader. The top half of the mold is then applied, being careful not to pinch the ends. The curing procedure described above is then followed. After removal from the mold the completed air cushion assembly appears substantially as shown in Fig. 38.

Where shorter cells are to be made, the axial lengths of the layers 174 to 177 and 198 are reduced. The method described with respect to Figs. 30 to 38 may be followed for the short cells where the end patches D are spaced apart axially only a short distance. However, it is preferable to use a single oblong five-layer patch rather than two heel-shaped five-layer patches on the top or bottom of the cell where the cell is very short. Figs. 39 to 50 illustrate a modified form of the present invention wherein such oblong five-layer patches are employed. As in the cushion of Figs. 30 to 38, the use of pre-cut multiple ply patches in building the cushion substantially speeds up the manufacture and materially reduces the labor cost.

Figure 39:
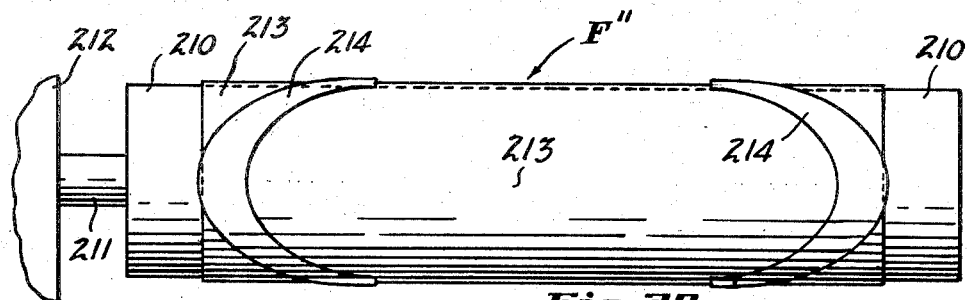
Figure 39 is a top plan view showing on a reduced scale a building form or mandrel for making short pneumatic rubber cells according to another method of the present invention, an inner layer of tube stock being wrapped around the mandrel and having narrow strips thereon for reinforcing the tube ends.

A small building form F″ similar to the form F′ is mounted on a cantilever shaft 211 carried by a rigid support 212, said building form being in the form of an externally cylindrical collapsible mandrel 210 similar to the mandrel 169 described above. A rectangular strip of gum rubber stock or tube stock is then applied to the mandrel by rotating the mandrel to form a tube 213, the side portions of the sheet overlapping at least half an inch or so to form a splice or lap joint 215. Four narrow strips 214 are then applied to the tube 213 so as to reinforce the same when the ends thereof are subsequently cut to form fish mouths at the opposite ends of the cell. Each strip 214 is made of gum rubber stock or tube stock and, prior to mounting on the mandrel, is in the form of a rectangular strip of uniform width. This strip is bent or curved when applied to the tube 213 generally as shown in Fig. 39. Four strips 214 are required, two on the top and two on the bottom of the tube 213 at the ends thereof.

Two oblong five-layer patches D' are formed to reinforce the tube 213. Each patch D' comprises four oblong patches 217 to 220 of bias-cut rubberized fabric and a small oblong cover patch 221 of a rubber compound, such as neoprene or the like, which is compounded for resistance to deterioration by heat, light and contact with oils, greases or the like.

Figure 40:
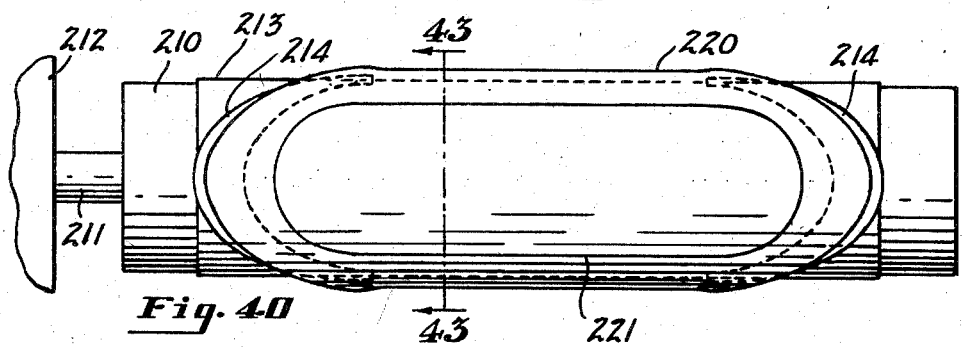
Figure 40 is a top plan view on the same scale as Figure 39 showing the tubular cell after two oblong five-layer patches have been applied thereto.
Figure 41:
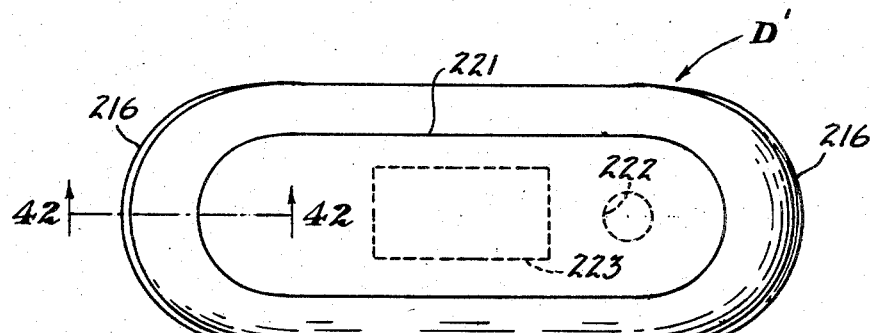
Figure 41 is a top plan view on the same scale as Figure 39 showing the tubular cell of Figure 40 removed from the mandrel after the grommet and bumper block have been attached and the ends of the cell have been closed and reinforced with rubber strips.

The opposite ends of each patch D' are shaped substantially like the patches D but the intermediate portion of each patch D' between the end portions is generally rectangular. Each of the rubber-containing layers 217 to 221 is of the same shape but the layers are of different sizes. The cord-reinforced layers 217 to 220 progressively increase in size just like the layers 182 to 185 of the patches D so that the marginal edges of the layers are parallel and staggered in a regular fashion. The individual layers of the patches D' are pre-cut with suitable dies and the patches are assembled into five-layer units prior to mounting on the tube 213. The rounded end portions of the oblong patches are shaped so that the cells of the completed pneumatic cushion will be substantially semicircular. Two patches D' are applied to the inner tubular layer 213 as shown in Fig. 40, the patches being placed on the top and bottom of the layer 213 in vertical alignment with their straight side edges parallel. The patches are stitched to the layer 213, for example by rotating the mandrel 210, so as to form a fabric-reinforced cell having open ends. While the cell is still on the mandrel it may be marked to locate the grommet hole 222.

The cell is removed from the mandrel and the grommet hole 222 is formed by drilling. A rubber bumper block 223 similar to the bumper blocks 75 and 76 may then be mounted within the cell. If the cell has an air fitting, it may be drilled for this fitting, and the fitting may be applied in the usual manner. As herein shown, the cell B has an air fitting or valve 239 but the cell A has no such fitting.

The end portions of the tube 213 including portions of the strips 214 may be cut and trimmed to form rounded fish mouths and the cut edges may be pinched together to close the ends of the cell. If desired the cutting and pinching may be in a single operation by means of a suitable die. After the ends are closed a narrow strip 216 of gum rubber stock is applied over each of the pinched ends of the tube.

Figure 42:
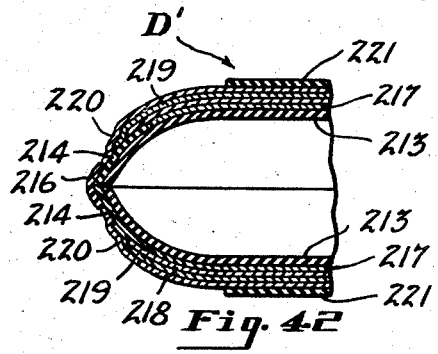
Figure 42 is a fragmentary longiutdinal vertical sectional view taken on the line 42—42 of Figure 41 and on a larger scale.
Figure 43:
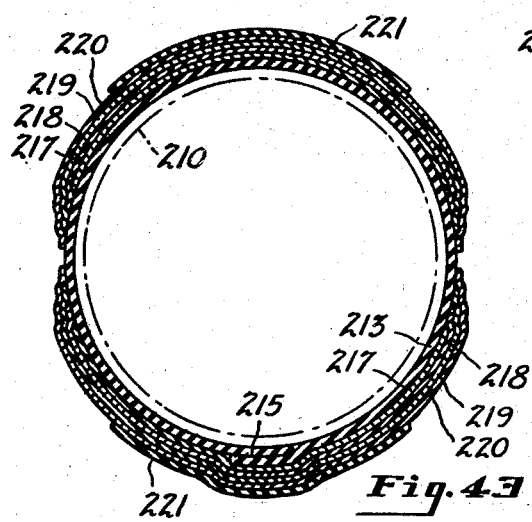
Figure 43 is a fragmentary vertical sectional view taken on the line 43—43 of Figure 40 and on a larger scale.

The outer rubberized fabric patch 220 has a rounded marginal edge substantially in engagement with the edge of the strip 216, which marginal edge may be used as a guide in trimming the tube 213 prior to the application of the reinforcing strips 216. Fabric patches 217 to 219 are shorter than the patch 220 and are completely covered by said patch as best shown in Figs. 42 and 43, each patch having marginal portions that extend beyond the marginal portions of the underlying patch. The patches 217 to 220 are preferably bias-cut rubberized fabric arranged so that adjacent patches have opposite bias angles. The patches are symmetrically arranged so that the overlaps are of uniform width throughout the periphery of the patches.

Figure 45:
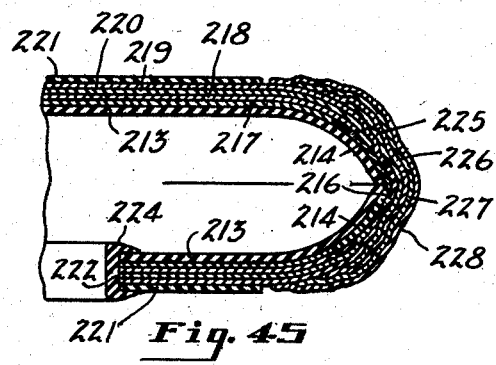
Figure 45 is a longitudinal vertical sectional view taken on the line 45—45 of Fig. 44 and on a larger scale.

After the ends of the cell have been closed as shown in Fig. 42, the marginal portions of the cell are reinforced with four fabric strips 225 to 228 of progressively increasing width. Said fabric strips perform the same function as the end strips 194 to 197 described above but also perform the additional function of reinforcing the sides of the cell. It will be noted that the outer layer 220 of each patch D' has a straight side edge which is spaced about one-quarter of an inch from the straight side edge of the outer layer 220 of the other patch D' as shown in Fig. 43. A quarter inch of the tube 213 is therefore exposed throughout the periphery of the cell prior to application of the strips 225 to 228. As herein shown, the first strip 225 has a uniform width of three inches so that it overlaps the marginal portions of the inner patches 217 of both patches D' throughout their peripheries as shown in Fig. 45. The widths of the marginal strips 226, 227 and 228 are four, five and six inches, respectively, so that the outer strip 228 completely covers all the other marginal strips.

Figure 44:
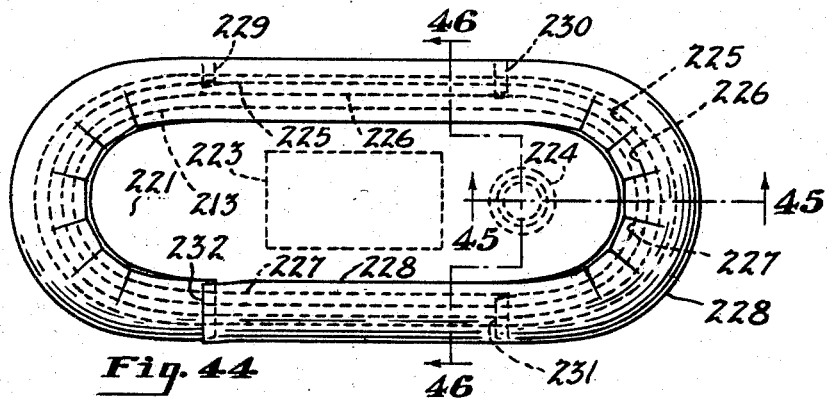
Figure 44 is a top plan view similar to Figure 41 and on the same scale showing the cell after the marginal portions thereof have been reinforced with fabric strips.
Figure 46:
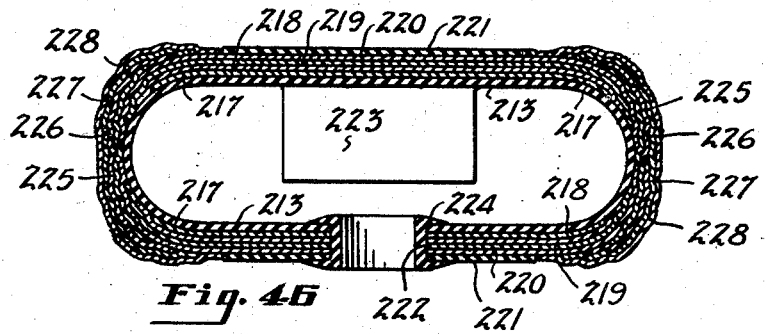
Figure 46 is a transverse vertical sectional view taken substantially on the line indicated at 46—46 in Figure 44.

The rubberized fabric strips 225 to 228 are stretched and elongated substantially as they are applied to the margins of the cell and extend all the way around the cell as best shown in Fig. 44, the ends of the first strip 225 overlapping at 229, the ends of the second strip 226 overlapping at 230, the ends of the third strip 227 overlapping at 231, and the ends of the fourth strip 228 overlapping at 232. The four strips are applied so that the center line thereof is at the median horizontal plane of the cell whereby the cell is symmetrical as shown in Fig. 45. The cords of adjacent strips may be arranged at an angle relative to each other just as with the end strips 135 to 138. After the end strips have been applied, the cell appears as shown in Fig. 44, the lap joints 229 to 232 being spaced apart substantially.

It will be noted that, as herein shown, the marginal edges of the outer fabric strip 228 are substantially in engagement with the margins of the cover patches 221 but do not overlap said patches. The grommet 224 may be mounted in its hole 222 either before or after closing of the ends of the cell. After the margins of the cell have been reinforced with the four fabric strips, the outer fabric strip is completely covered by means of a cover strip 233 of a rubber compound such as neoprene or the like which is compounded for resistance to oil and grease, like the patches 221. The strip 233 is initially rectangular and has a uniform width about one inch greater than that of the outer fabric strip 228 so that it will completely cover such fabric strip and overlap the patches 221. The strip 233 is stretched around the margins of the cell and overlaps itself to form a splice or lap joint 234. The strip 233 overlaps the two cover patches 221 throughout the margin of both of said cover patches so that the cell is completely covered with neoprene or similar oil-resistant material.

After the two cells A and B have been completed they are joined together in the same manner as the cells $C_a$ and $C_b$ described above, the grommets 224 being joined together so as to form a passage 240 connecting the interiors of the two cells. The bottom cell B has an air fitting 239 mounted therein but the upper cell A does not require such a fitting. The upper metal channel 235 having vertical flanges 236 is bonded to the top cell A and a similar channel 237 having vertical flanges 238 and an opening of a size to receive the fitting 239 is bonded to the bottom cell B. Filler strips 241 similar to the strips 142, 143 and 206 may be provided between the cells and the channels near the sides of the channels. The uncured pneumatic cushion assembly may be molded in a small mold of generally the same type as described in Figures 20 to 27. After vulcanization the completed air cushion assembly appears substantially as shown in Figure 50. The marginal portions of the oblong cells A and B have the same rounded cross section of Figure 50 throughout their periphery. During molding the flattened cross section of Figures 36, 45 and 48 becomes substantially semi-circular.

The air cushion assemblies made by each of the methods described above are durable and provide excellent spring supports for automobiles and trucks, the elastic rubber fabric-reinforced walls of the cushions being strong and very flexible so as to provide a soft ride even when supporting heavy loads. The cords employed in the rubberized fabric layers may be made of cotton but are preferably made of rayon, nylon, Dacron or the ilke so as to have high tensile strength. The rubber compounds employed may be conventional high quality carcass compounds of the type used in rubber tires containing substantial amounts of reinforcing carbon black and compounded for long flex life and high flexibility or other rubber compounds suitable for pneumatic cushions. The inner liners for the individual cells may be made of conventional tube stock of the type used to make conventional inner tubes. Both natural and synthetic rubbers may be used to make the pneumatic cushions, those rubbers which are suitable for pneumatic rubber tires also being suitable for the cushions of the present invention.

Although the drawings are not drawn exactly to scale, they accurately show the staggered arrangement of the edges of the various rubber and fabric layers and the overlapping arrangement of the various layers, it being understood that the constructions shown in the drawings as well as those defined in the claims form a part of this disclosure.

In accordance with the present laws and statues, the principles of the present invention may be utilized in various ways, numerous modifications and alterations being contemplated, substitution of parts and changes in methods of construction being resorted to as desired, it being understood that the embodiments of the articles and methods shown and described herein are given merely for purposes of explanation and illustration without intending to limit the scope of the claims to the specific details disclosed.

What we claim and desire to secure by Letters Patent is:

1. A method of making a pneumatic cushion comprising forming a rubber tube, supporting said tube, adhering several layers of cord-reinforced rubber to said tube, the layers at the opposite ends of the tube being rounded above and below a plane through the axis of said tube so as to form a fish mouth at the opposite ends of the tube and having rounded marginal edges which are substantially uniformly offset so that said edges are stepped axially and circumeferentially, the outer layers at the ends of the tube overlapping and extending a fraction of an inch axially and circumferentially beyond all of the underlying layers on the tube, cutting the end portions of the tube a small fraction of an inch beyond the outermost layer to form rounded tube edges in the form of a fish mouth, flattening the cell formed by said tube and said layers and pinching said rounded tube edges together to close the ends of said tube and said cell, and reinforcing the portions of the tube not covered by the cord-reinforced layers by applying a series of reinforcing strips of cord-reinforced rubber material, said strips extending around the rounded tube edges and overlapping all of said rounded marginal edges, the widths of said strips increasing outwardly of the cell so that the side edges of the strips are offset, each strip being placed to completely cover the underlying strip and to overlap a majority of said rounded marginal edges.

2. A method as defined in claim 1 wherein said layers are formed from rubberized bias-cut fabric sheets having a length not substantially less than that of said tube, each sheet being wrapped around the tube and trimmed at its ends to the fish mouth shape, adjacent fabric layers having opposite bias angles so that the cords of adjacent layers cross.

3. A method as defined in claim 1 wherein the intermediate portions of said layers are formed from rubberized bias-cut fabric sheets having a length materially less than that of said tube which are wrapped around the tube with their end edges staggered axially and the end portions of said layers are formed from heel-shaped fabric patches which overlap said fabric sheets, the edges of said patches overlapping said sheets being staggered axially.

4. A method as defined in claim 1 wherein said layers are formed from oblong fabric patches having rounded end portions, said patches being applied to the top and bottom sections of the tube, each patch being a greater length and width than the underlying patch and completely covering the same, the outermost patch having a length not substantially less than that of the tube and a width not substantially less than half the circumference of said tube, the marginal edges of the patches being regularly offset, and wherein said reinforcing strips extend all the way around the margin of said cell and overlap each of said patches throughout the margin thereof.

5. A method of making an inflatable elastic rubber pneumatic cushion comprising wrapping a sheet of uncured rubber around an externally cylindrical building form and splicing the edges thereof to form a tube, wrapping a series of bias-cut rubberized fabric sheets around the tube, the first fabric sheet being wrapped around the tube and overlapped on itself to form a lap joint, the ends of said first sheet being spaced axially a substantial distance from the ends of said tube, the second fabric sheet having a length less than that of the first fabric sheet and the outermost fabric sheet having a length less than that of the second fabric sheet whereby the end edges of the fabric sheets are regularly stepped when the sheets are wrapped around the tube, applying to the end portion of the tube a first cord-reinforced rubber patch having a D-shaped marginal edge, the straight marginal portion of said first patch overlapping the first fabric sheet, applying a second cord-reinforced rubber patch over said first patch to cover the same, said second patch being larger than the first patch and having a D-shaped marginal edge surrounding the marginal edge of the first patch and a straight marginal portion overlapping the second fabric sheet, and applying an outer patch of cord-reinforced rubber over said first and second patches having a D-shaped marginal edge surrounding the margins of all the underlying patches, the patches being arranged so that their marginal edges are stepped regularly, the outer patch extending substantially half way around the circumference of the tube, applying a similar series of cord-reinforced rubber patches to the opposite side of the tube so that the rounded edges of the largest patches are substantially in the form of a fish mouth, cutting the tube within half an inch of said largest patches and substantially parallel to said rounded edges and joining the cut tube edges while flattening the tube to close the end of the tube, and applying binding strips across said marginal edges, the binding strips each extending over the tube end and across a plurality of said marginal edges.

6. The method of making an elongated inflatable cushion which comprises forming cord reinforced sheet material into an open ended multiple layer tube, supporting the tube in substantially cylindrical form, trimming the cord material layers one at a time at one end of the cylindrical tube to provide staggered end edges on the cord material layers, flattening the tube and applying binding strips across the staggered end edges of the flattened tube, the binding strips each extending over the tube end and across a plurality of said staggered end edges.

7. A method of making an inflatable rubber cushion comprising forming a rubber tube, forming multiple-ply patches of rubberized fabric for both the top and bottom sections of said tube, the marginal edges of both said patches being offset, both said patches having rounded ends and a width at least about half the circumference of said tube, adhering said patches to the top and bottom surfaces of said tube while aligning the patches vertically, trimming the ends of the tube a small fraction of an inch beyond the patches to form a fish mouth at the opposite ends of the tube, pinching the trimmed edge portions of the tube together to close the tube ends, applying a series of fabric strips around the periphery of the patches so as to overlap both patches throughout their periphery, the edges of said strips being offset throughout said periphery, all of said strips overlapping a majority of the layers of said patches, and covering the resulting air cell with an oil-resistant elastic polymeric material.

8. A method of making an inflatable rubber cushion comprising forming a rubber tube, applying multiple-ply patches of rubberized fabric to both the top and bottom surfaces of the tube, both said patches having rounded longitudinally staggered edges at the ends of the tube and being wrapped around the tube, trimming the ends of the tube a short distance beyond the patches to form trimmed edge portions and a fish mouth at the opposite ends of the tube, pressing the trimmed edge portions of the tube together to close the tube ends, and applying a series of fabric strips to the closed ends of the tube so as to overlap both patches and reinforce the ends of the tube, the side edges of said strips being offset and arranged in stepped relation, and covering the resulting air cell with an oil-resistant elastic polymeric material.

9. A method of making an elongated inflatable cushion which comprises forming cord-reinforced rubber sheet material into an open-ended multiple-layer tube of substantially cylindrical form, cutting the cord material layers one at a time to form rounded staggered end edges at one end of the tube, flattening the tube and applying binding strips of cord-reinforced rubber sheet material across the staggered end edges of the flattened tube, the binding strips each extending over the tube end and across a plurality of said staggered end edges.

10. A method as defined in claim 9 wherein said cord material layers are cut to form said rounded end edges prior to forming of said tube.

References Cited in the file of this patent

UNITED STATES PATENTS

| | | |
|---|---|---|
| 2,208,540 | Brown | July 16, 1940 |
| 2,482,072 | Soderquist | Sept. 13, 1949 |
| 2,575,764 | Morner | Nov. 20, 1951 |
| 2,628,652 | Orr | Feb. 17, 1953 |
| 2,703,770 | Melzer | Mar. 8, 1955 |
| 2,742,301 | Pointer | Apr. 17, 1956 |
| 2,743,480 | Frank | May 1, 1956 |